(12) United States Patent
Uekado et al.

(10) Patent No.: US 10,030,805 B2
(45) Date of Patent: Jul. 24, 2018

(54) HEAT-INSULATING WALL, AND HEAT-INSULATING HOUSING AND METHOD FOR PRODUCING THE SAME

(71) Applicant: Panasonic Intellectual Property Management Co., Ltd., Osaka-shi, Osaka (JP)

(72) Inventors: Kazutaka Uekado, Hyogo (JP); Tsuyoki Hirai, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 794 days.

(21) Appl. No.: 14/398,693

(22) PCT Filed: Jun. 20, 2013

(86) PCT No.: PCT/JP2013/003874
§ 371 (c)(1),
(2) Date: Nov. 3, 2014

(87) PCT Pub. No.: WO2013/190846
PCT Pub. Date: Dec. 27, 2013

(65) Prior Publication Data
US 2015/0140244 A1 May 21, 2015

(30) Foreign Application Priority Data

Jun. 20, 2012 (JP) .................................. 2012-138697
Dec. 25, 2012 (JP) .................................. 2012-280664

(51) Int. Cl.
*F16L 59/06* (2006.01)
*B32B 5/20* (2006.01)
(Continued)

(52) U.S. Cl.
CPC ............. *F16L 59/06* (2013.01); *B29C 44/18* (2013.01); *B32B 5/20* (2013.01); *C08J 9/0061* (2013.01);
(Continued)

(58) Field of Classification Search
CPC ......... F16L 59/06; F16L 59/029; E04B 1/806; E04C 2/205; B32B 5/20; Y10T 428/1376; F25D 23/064; C08J 9/0009
See application file for complete search history.

(56) References Cited

U.S. PATENT DOCUMENTS 3,684,342 A 8/1972 Jansen
6,001,890 A 12/1999 Hamilton
(Continued)

FOREIGN PATENT DOCUMENTS

JP 2-290486 11/1990
JP 6-213561 8/1994
(Continued)

OTHER PUBLICATIONS

Office Action issued in Chinese Application No. 201380025985.7, dated Sep. 6, 2015, 10 pages with an English Translation.
(Continued)

*Primary Examiner* — Walter Aughenbaugh
(74) *Attorney, Agent, or Firm* — Hamre, Schumann, Mueller & Larson, P.C.

(57) ABSTRACT

A heat-insulating housing (21) includes: a wall body; and an open-cell resin body (4) of thermosetting resin with which a heat-insulating space formed by the wall body is filled by integral foaming, the open-cell resin body including: a plurality of cells (47); a cell film portion (42); a cell skeleton portion (43); a first through-hole (44) formed so as to extend through the cell film portion; and a second through-hole (45) formed so as to extend through the cell skeleton portion,
(Continued)

wherein the plurality of cells communicate with one another through the first through-hole and the second through-hole.

6 Claims, 16 Drawing Sheets

(51) Int. Cl.
| | | |
|---|---|---|
| *F16L 59/02* | (2006.01) | |
| *C08J 9/00* | (2006.01) | |
| *B29C 44/18* | (2006.01) | |
| *E04B 1/80* | (2006.01) | |
| *E04C 2/20* | (2006.01) | |
| *F25D 23/06* | (2006.01) | |
| *B29K 75/00* | (2006.01) | |
| *B29K 105/04* | (2006.01) | |
| *B29L 9/00* | (2006.01) | |
| *B29L 31/10* | (2006.01) | |

(52) U.S. Cl.
CPC .............. *E04B 1/806* (2013.01); *E04C 2/205* (2013.01); *F16L 59/029* (2013.01); *F25D 23/064* (2013.01); *F25D 23/065* (2013.01); *B29 2075/00* (2013.01); *B29K 2105/045* (2013.01); *B29L 2009/00* (2013.01); *B29L 2031/10* (2013.01); *C08J 2205/05* (2013.01); *C08J 2375/04* (2013.01); *C08J 2423/06* (2013.01); *C08J 2477/00* (2013.01); *F25D 2201/1262* (2013.01); *Y10T 428/1376* (2015.01); *Y10T 428/231* (2015.01); *Y10T 428/233* (2015.01)

(56) References Cited

U.S. PATENT DOCUMENTS

| | | |
|---|---|---|
| 2002/0168496 A1 | 11/2002 | Morimoto et al. |
| 2004/0229968 A1 | 11/2004 | Dontula et al. |
| 2005/0176836 A1 | 8/2005 | Dontula et al. |

FOREIGN PATENT DOCUMENTS

| | | |
|---|---|---|
| JP | 8-311230 | 11/1996 |
| JP | 9-119771 | 5/1997 |
| JP | 2001-248782 | 9/2001 |
| JP | 2006-528724 | 12/2006 |
| JP | 2007-238141 | 9/2007 |
| WO | 2009/154345 | 12/2009 |

OTHER PUBLICATIONS

Extended European Search Report, Jun. 1, 2015; European Patent Application No. 13807177.4 (4 pages).

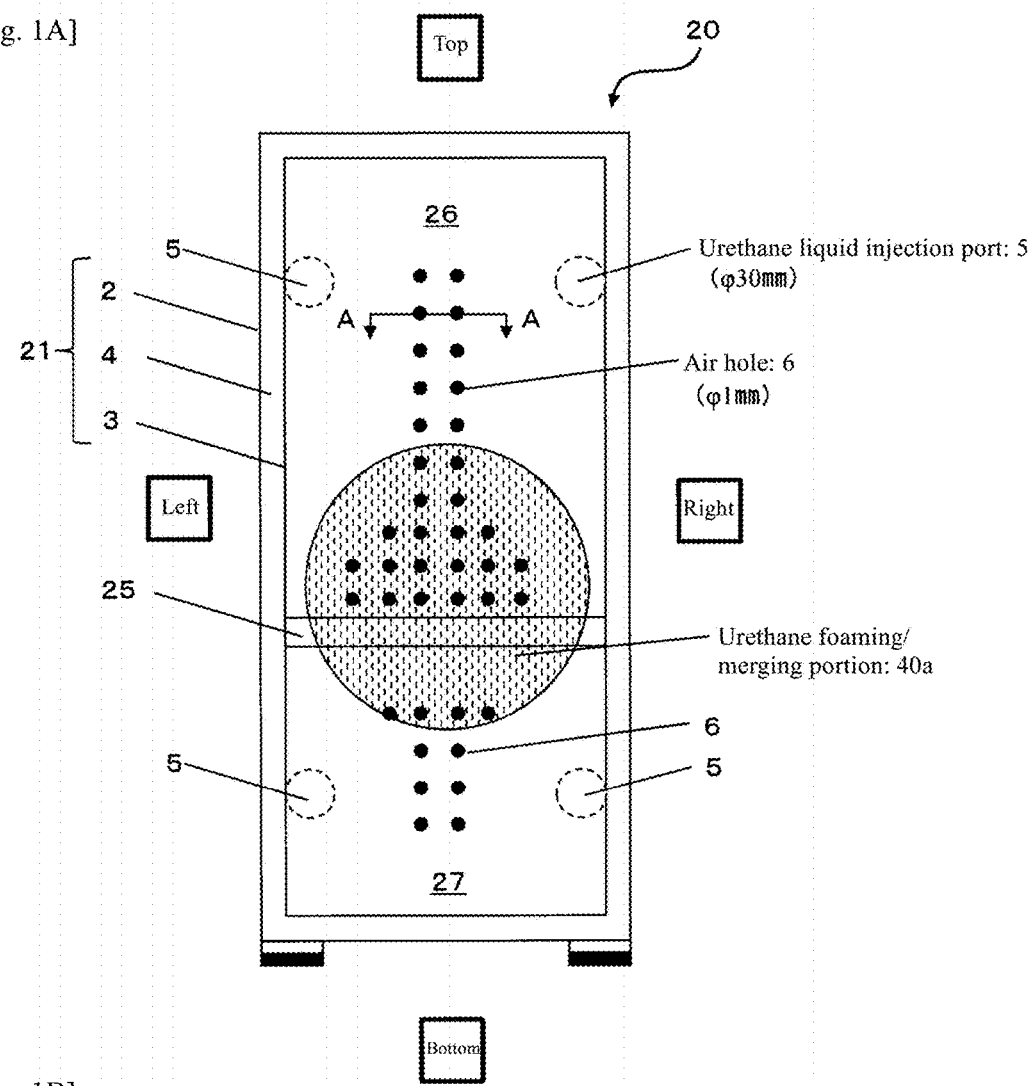
[Fig. 1A]
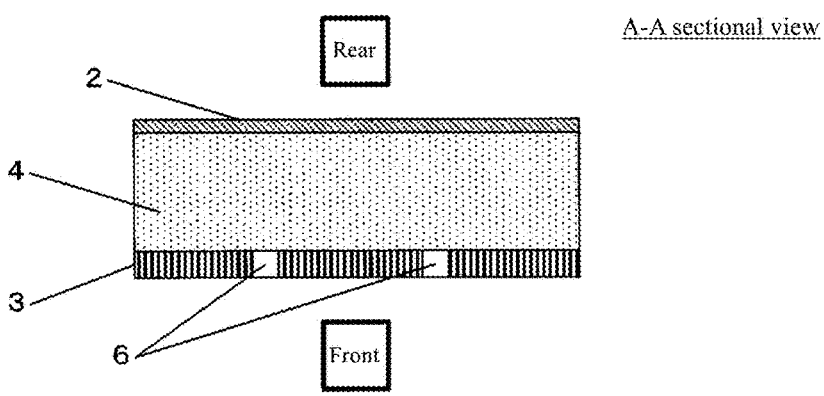
[Fig. 1B]

[Fig. 2A]
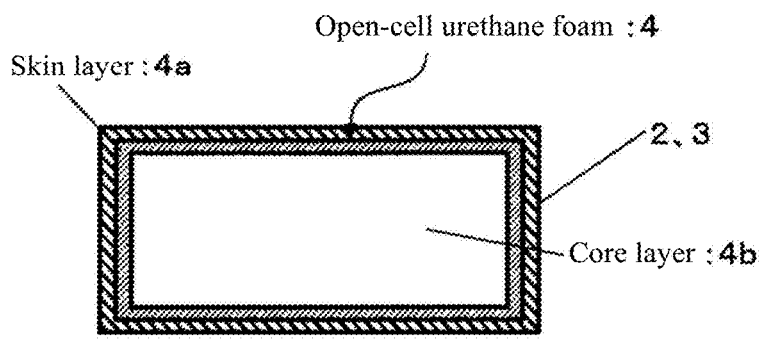
[Fig. 2B]
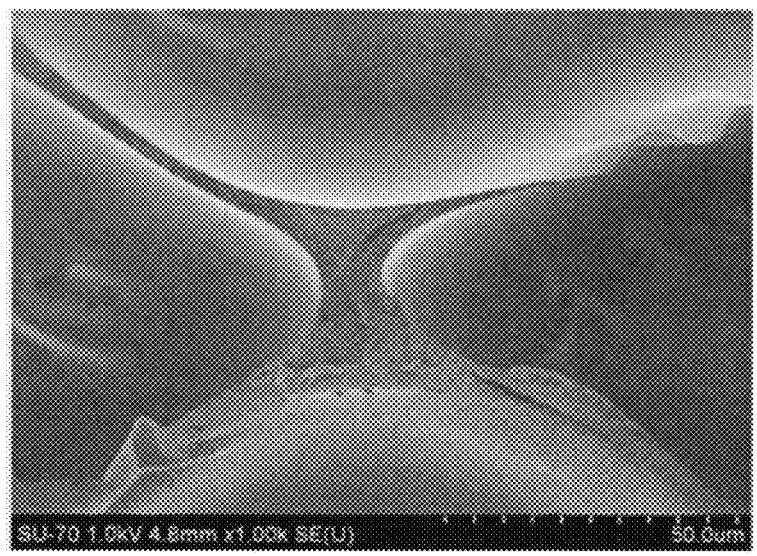
[Fig. 2C]
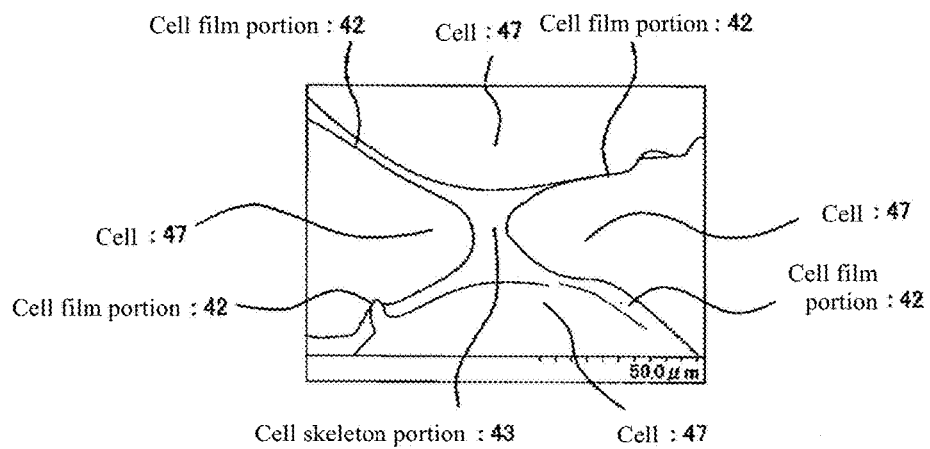

[Fig. 2D]
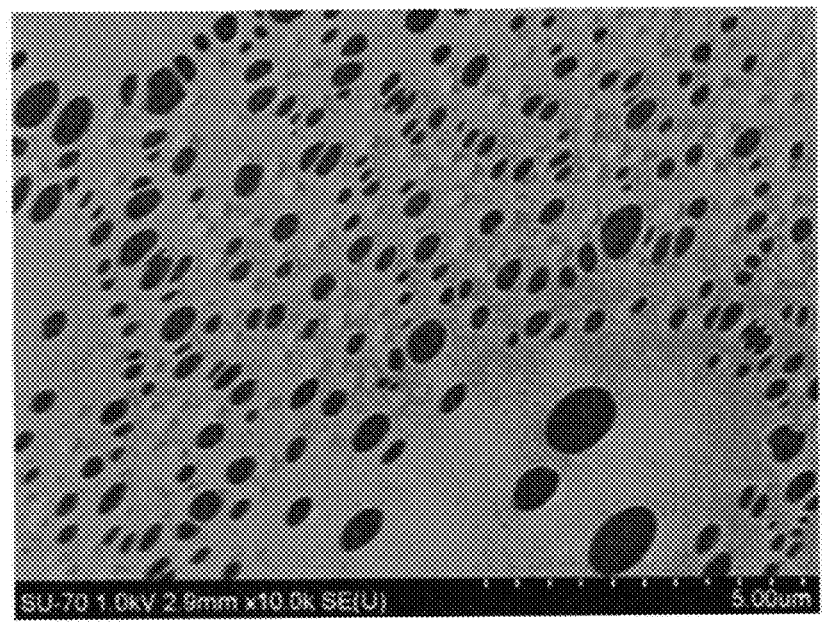
[Fig. 2E]
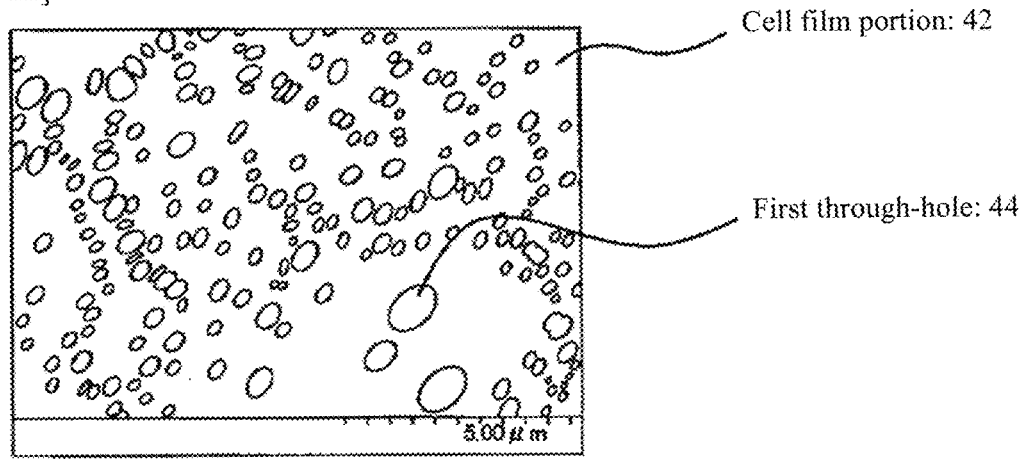
Cell film portion: 42
First through-hole: 44

[Fig. 2F]
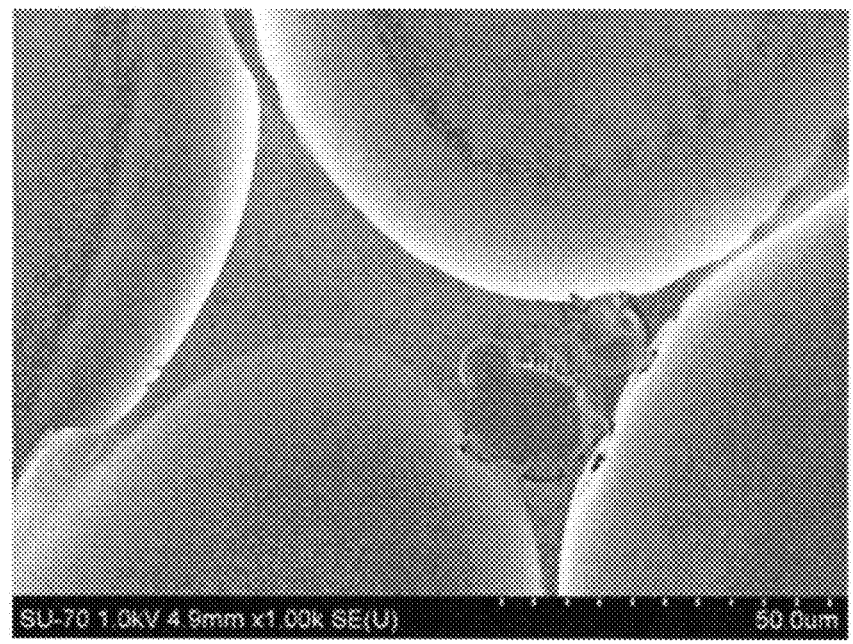
[Fig. 2G]
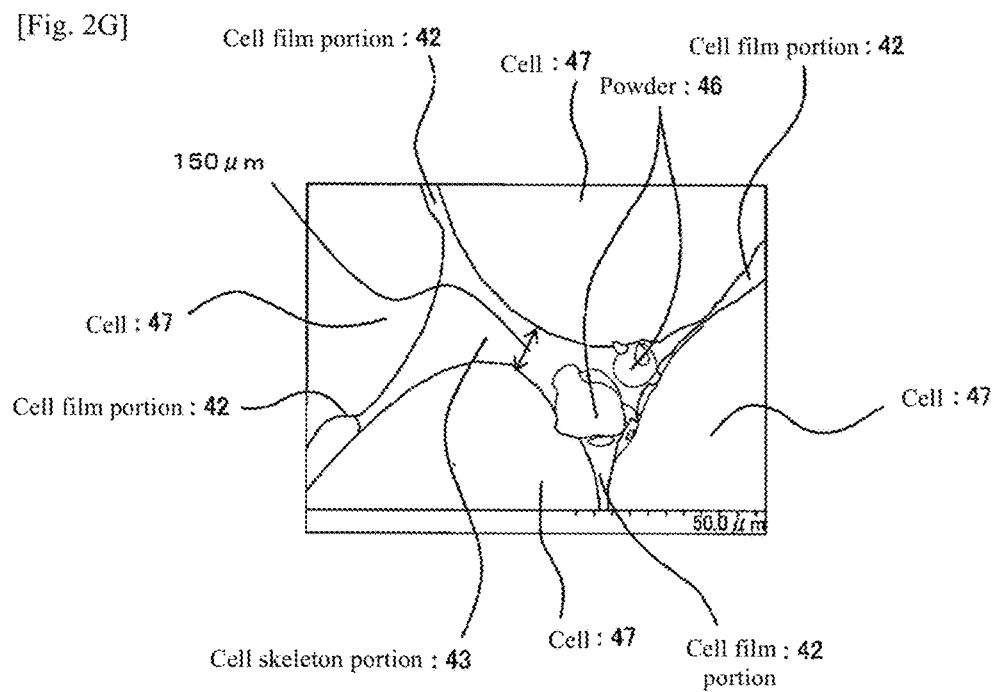

[Fig. 2H]
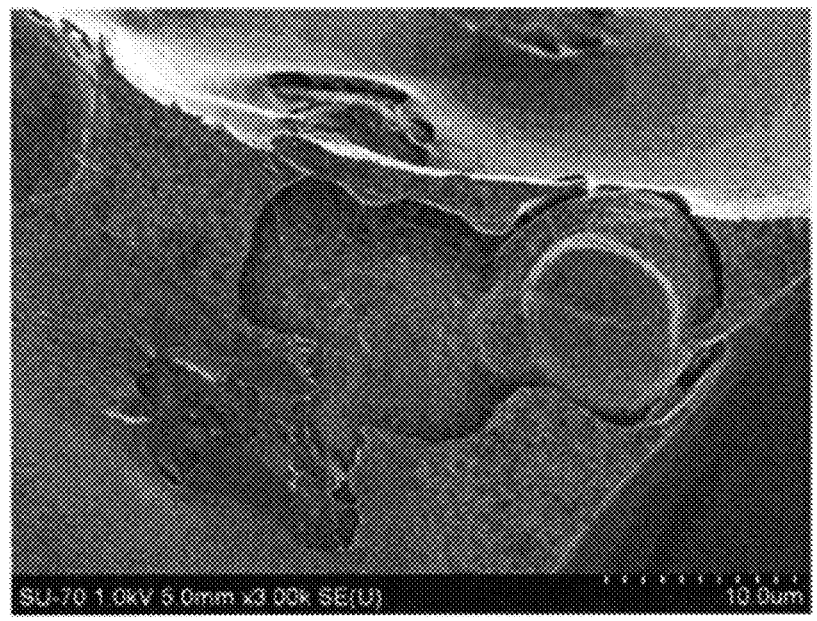
[Fig. 2I]
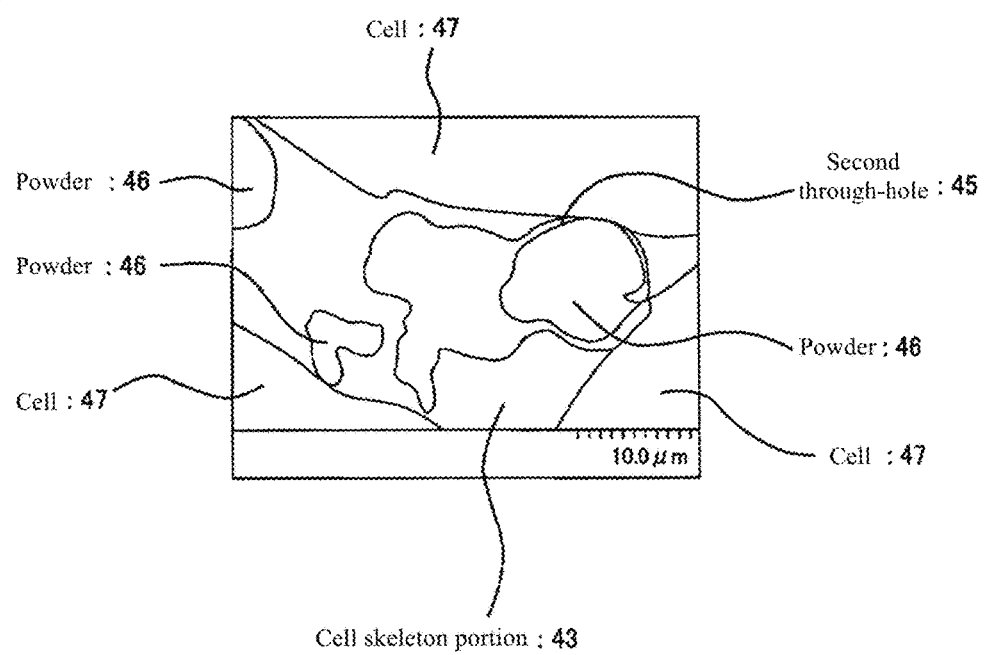

[Fig. 3]
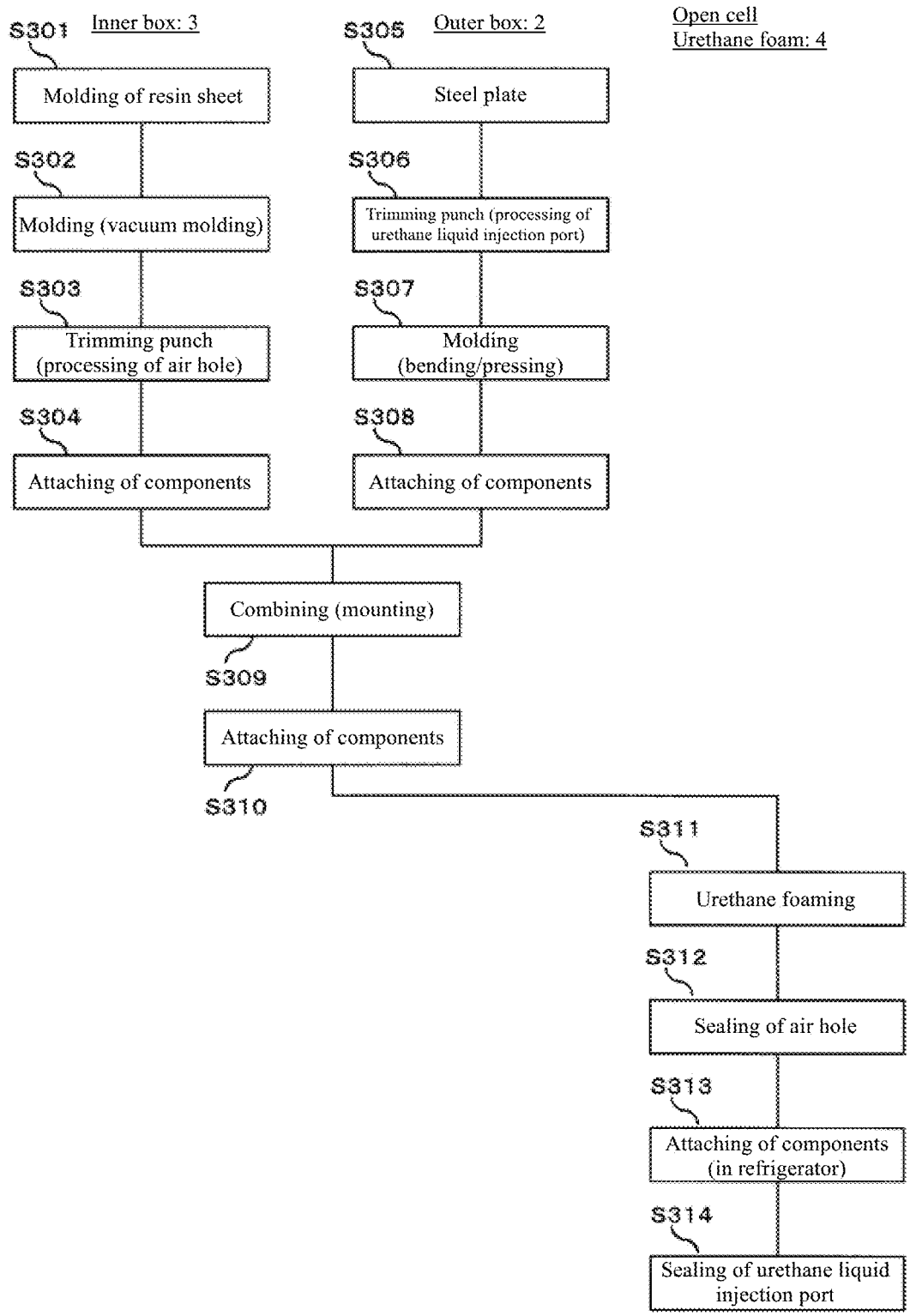

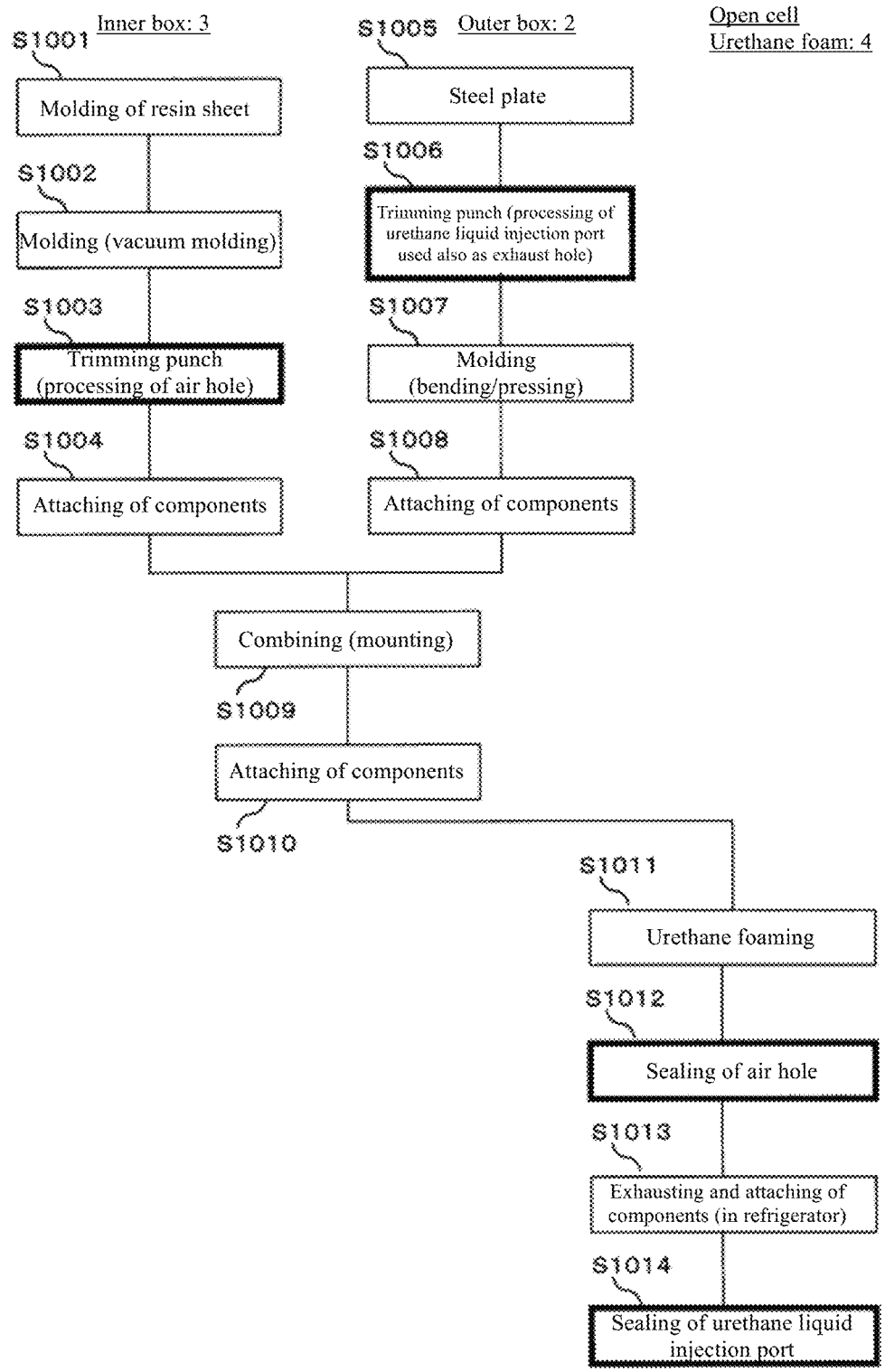
[Fig. 4]

[Fig. 5]
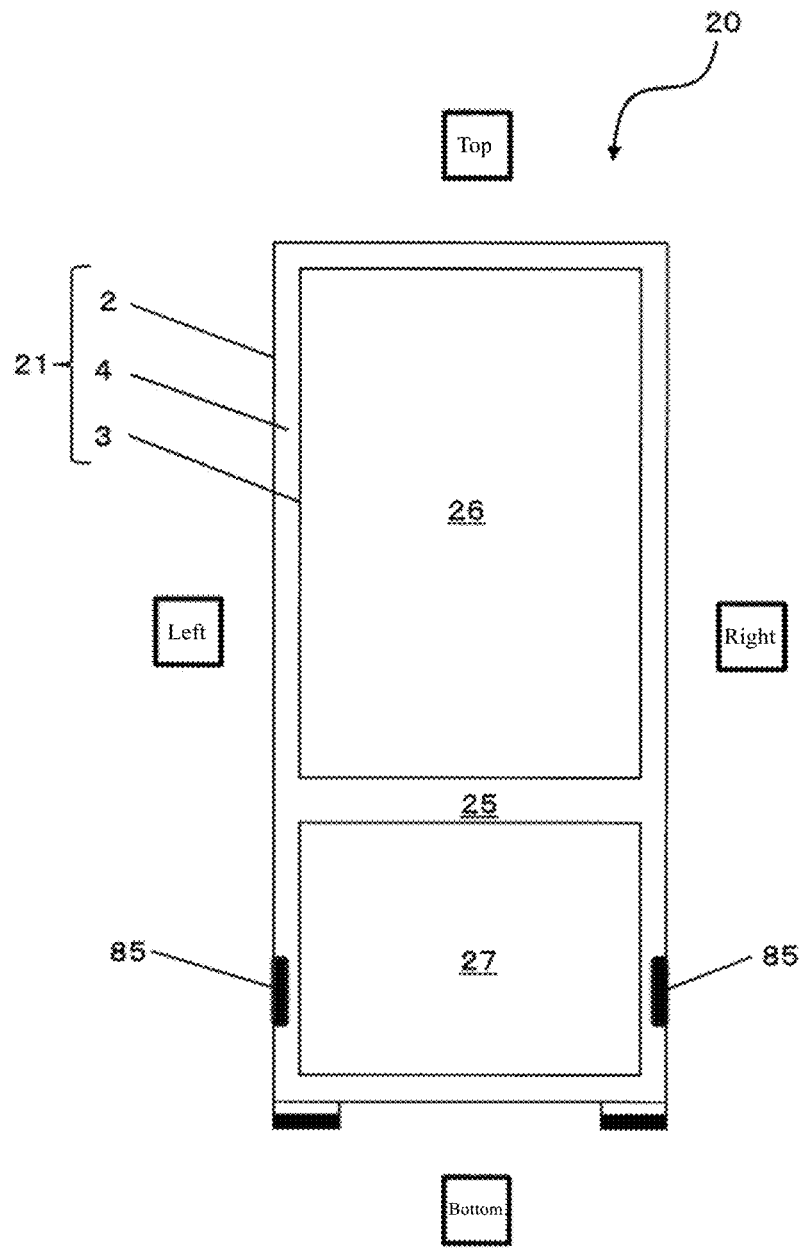

[Fig. 6]
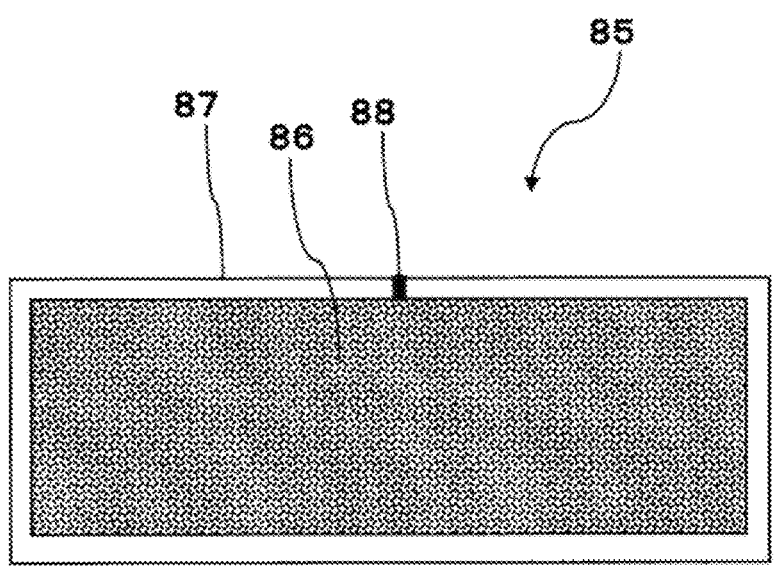

[Fig. 7]

|  | Example 1 | Example 2 | Comparative Example 1 | Comparative Example 2 |
|---|---|---|---|---|
| Components | PE | Ny-12 | Ny-11 | Absent |
| Sp value | 8.1 | 9.5 | 10.1 | — |
| Increase in pressure of vacuum pack | ○ | ○ | × | × |
| First through-hole in cell film portion | Present | Present | Present | Present |
| Second through-hole in cell skeleton portion | Present | Present | Absent | Absent |
| Second through-hole in skin layer | Present | Present | Absent | Absent |

[Fig. 8A]
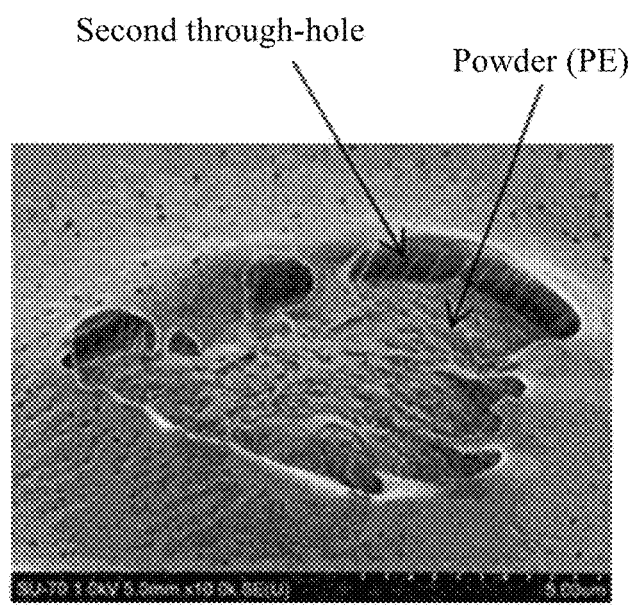
[Fig. 8B]
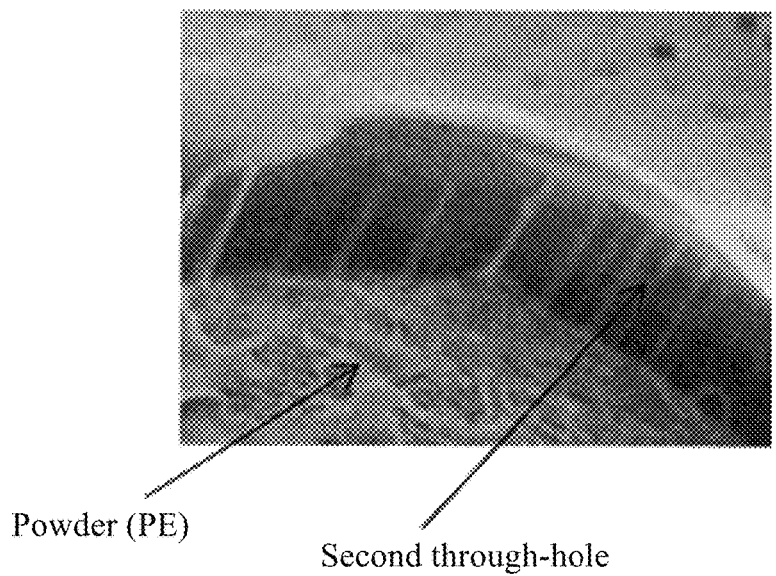

[Fig. 8C]
Powder (Ny-12)   Second through-hole
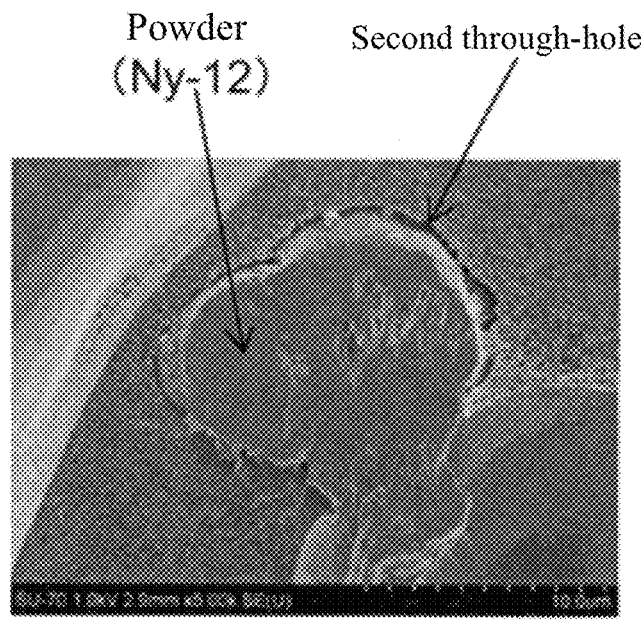
[Fig. 8D]
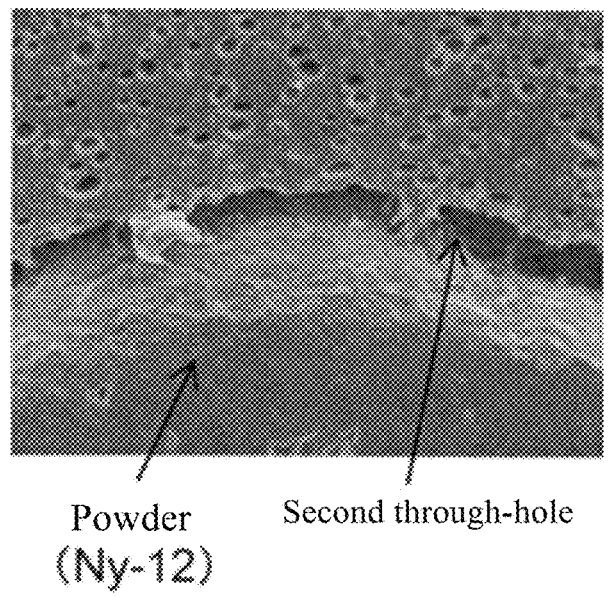
Powder (Ny-12)   Second through-hole

[Fig. 8E]
Powder (Ny-11)
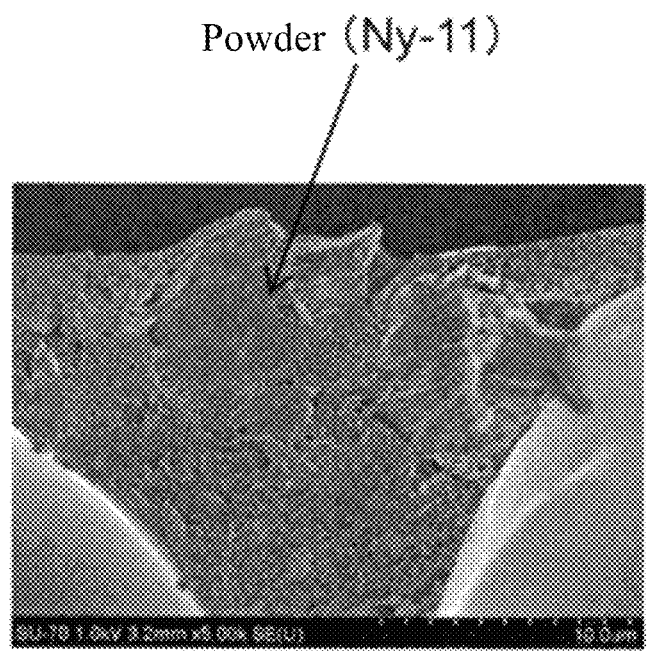
[Fig. 8F]
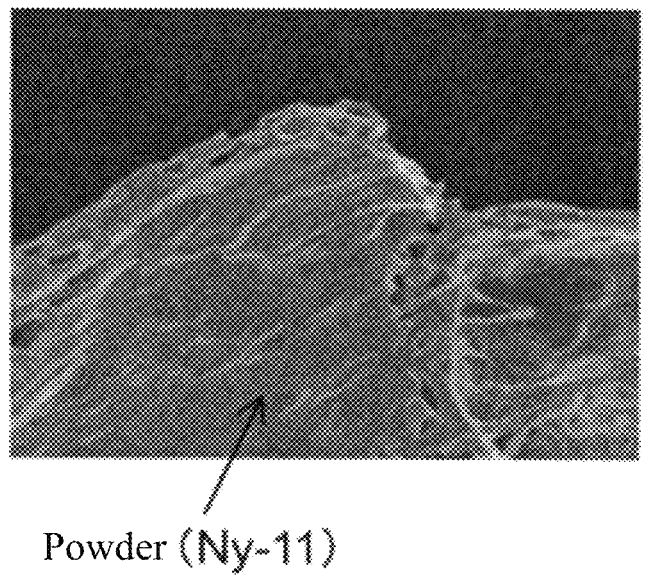
Powder (Ny-11)

[Fig. 9]
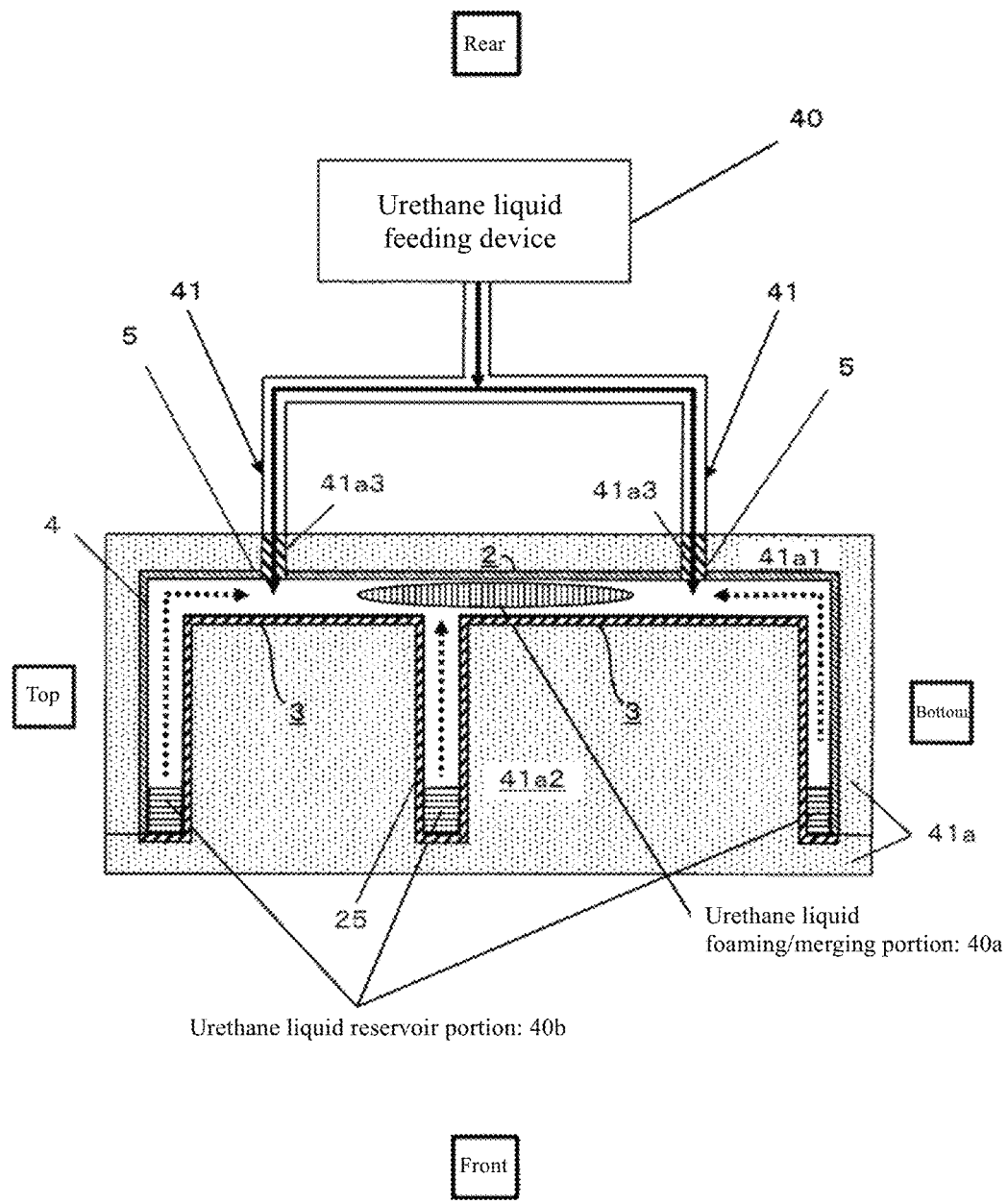

[Fig. 10]
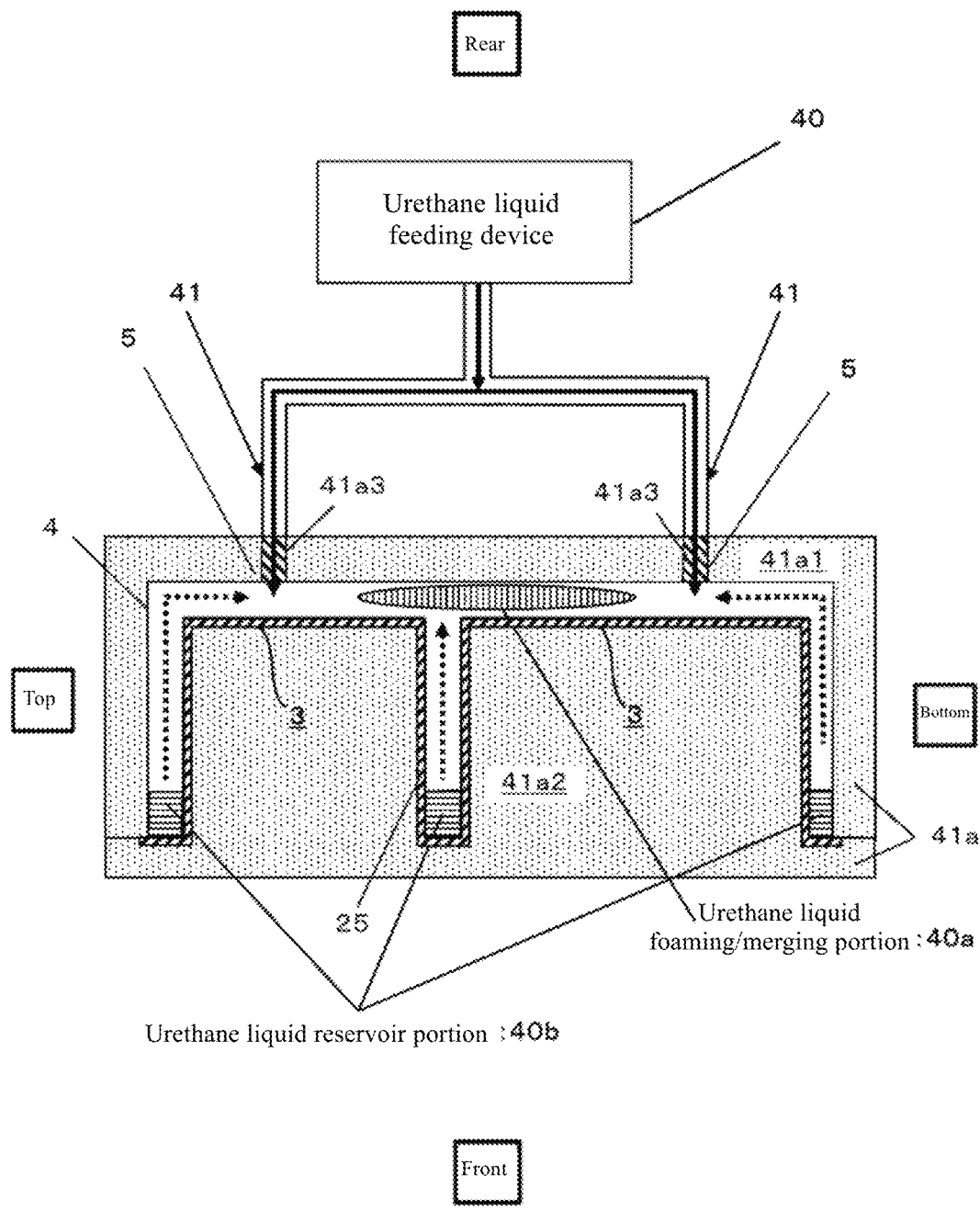

[Fig. 11]
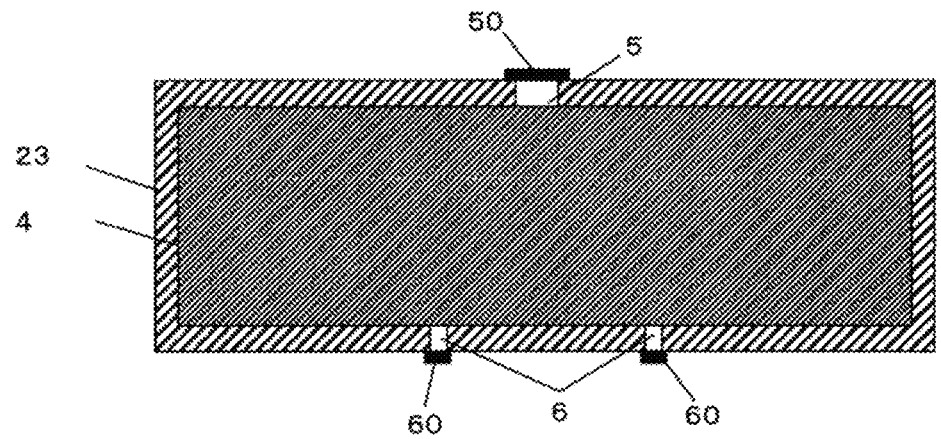
[Fig. 12]
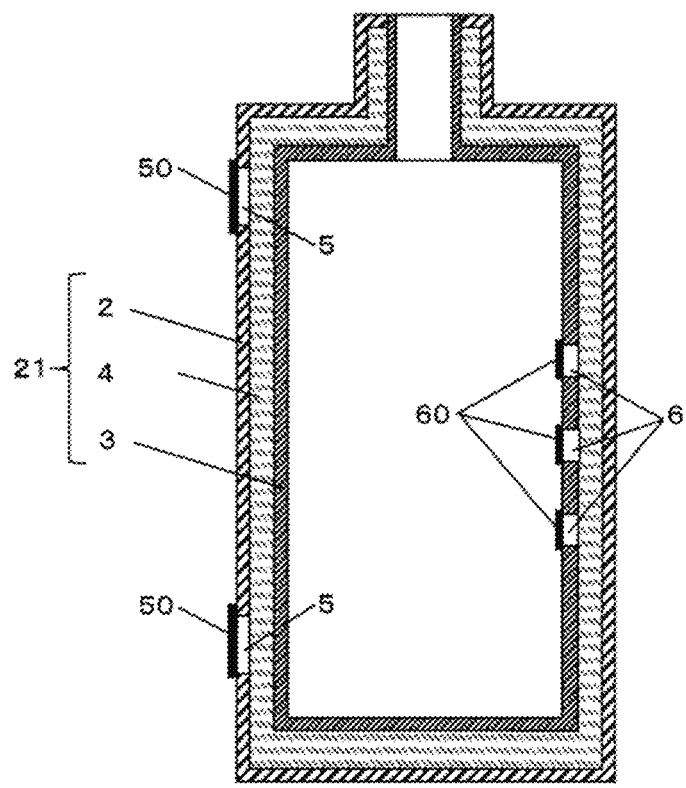

HEAT-INSULATING WALL, AND HEAT-INSULATING HOUSING AND METHOD FOR PRODUCING THE SAME

TECHNICAL FIELD

The present invention relates to a heat-insulating wall, and a heat-insulating housing and a method for producing the same.

BACKGROUND ART

In recent years, energy saving has been actively promoted as a measure against global warming that is a global environmental problem. For example, in various kinds of cooling/warming equipment such as refrigerators and vending machines, a configuration has been employed in which a heat-insulating space between an outer box and an inner box of a heat-insulating box that forms the main body of the equipment is filled with a "closed-cell urethane foam" and the urethane foam is foamed. However, from the viewpoint of energy saving, a transition is being made from the above-mentioned configuration to a configuration in which the heat-insulating space is filled with a "closed-cell urethane foam" and the urethane foam is foamed after a "vacuum heat-insulating material" is disposed in the heat-insulating space. This vacuum heat-insulating material is formed in the following manner: a core material formed of glass wool or the like is decompression-sealed in a bag-shaped outer casing material having gas barrier properties. Further, some vacuum heat-insulating materials are formed by decompression-sealing an adsorption material together with a core material. Vacuum heat-insulating materials have heat-insulating performance that is about 20 times as great as the heat-insulating performance of hard urethane foams. Thus, vacuum heat-insulating materials have such excellent characteristics that even when the thickness is reduced, sufficient heat-insulating performance is achieved. Therefore, vacuum heat-insulating materials satisfy customer needs to increase the volume of the inside of a heat-insulating box by thinning the heat-insulating box. Moreover, vacuum heat-insulating materials attract attention as an effective tool for saving energy by improving heat-insulating performance.

However, heat-insulating spaces of heat-insulating boxes of refrigerators and the like generally have a complicated shape. Thus, a covering area of the vacuum heat-insulating material, i.e. a ratio of the area of the vacuum heat-insulating material to the total heat transfer area of the heat-insulating box is limited. Thus, Patent Literature 1 proposes a technique in which a heat-insulating space of a heat-insulating box is filled with an "open-cell urethane foam" from an air feeding port for blow molding in the heat-insulating box and the urethane foam is foamed, followed by evacuating the inside of the heat-insulating box to vacuum using a vacuum exhaust apparatus connected to the air feeding port. The "open-cell" refers to a structure in which respective cells communicate with one another. The "closed-cell" refers to a structure in which respective cells are independent and do not communicate with one another.

CITATION LIST

Patent Literature

PTL 1: JP 9-119771 A

SUMMARY OF INVENTION

Technical Problem

In Patent Literature 1, however, the structure of the open-cell urethane foam itself is not made clear. Further, it is neither disclosed nor suggested that the skin layer of the open-cell urethane foam has continuous air permeability. The structure of the skin layer is not described in any of the prior art documents.

Thus, there has been room for improvement in view of suppressing deterioration of heat-insulating properties and deformation of a heat-insulating wall by causing cells of an open-cell resin body to communicate with one another.

The present invention has been devised for solving the above-mentioned problem, and an object of the present invention is to provide a heat-insulating wall which can resist deterioration of heat-insulating properties and deformation as compared to conventional one, and a heat-insulating housing and a method for producing the same.

Solution to Problem

A heat-insulating wall according to an aspect of the present invention includes: a wall body whose hollow portion is a heat-insulating space; and an open-cell resin body formed of a thermosetting resin, with which the heat-insulating space is filled by integral foaming, the open-cell resin body including: a plurality of cells; a cell film portion which is formed at a location where the cells are adjacent to one another; a cell skeleton portion which is formed at a location where the cells are adjacent to one another and which is formed in such a manner that a distance between the adjacent cells is greater than a thickness of the cell film portion; a first through-hole formed so as to extend through the cell film portion; and a second through-hole formed so as to extend through the cell skeleton portion, wherein the plurality of cells communicate with one another through the first through-hole and the second through-hole.

According to the present invention, in a heat-insulating wall with an airtightly closed space filled with an open-cell urethane foam by integral foaming, for example, deformation of the heat-insulating wall by a residual gas in urethane foaming can be prevented even in long-term use.

Advantageous Effects of Invention

According to the present invention, there can be provided a heat-insulating wall which can resist deterioration of heat-insulating properties and deformation as compared to conventional one, and a heat-insulating housing and a method for producing the same.

The foregoing object, other objects, features and advantages of the present invention will become apparent from the following detailed descriptions of preferred embodiments with reference to the accompanying drawings.

BRIEF DESCRIPTION OF DRAWINGS

FIG. 1A is a front view of a refrigerator including a heat-insulating box according to Embodiment 1 of the present invention.

FIG. 1B is a local sectional view showing a part of the refrigerator taken along line A-A in FIG. 1A.

FIG. 2A is a view schematically showing an example of a structure of an open-cell urethane foam shown in FIG. 1A.

FIG. 2B is an enlarged photograph showing a state between a pair of cells in the open-cell urethane foam shown in FIG. 1A.

FIG. 2C is a view for explaining a configuration between a pair of cells shown in FIG. 2B.

FIG. 2D is an enlarged photograph showing a state in which a first through-hole is formed in a cell film portion of an open-cell urethane foam shown in FIG. 2A.

FIG. 2E is a view for explaining a configuration of the cell film portion and first through-hole shown in FIG. 2D.

FIG. 2F is an enlarged photograph showing a state of a cell skeleton portion of the open-cell urethane foam shown in FIG. 2A.

FIG. 2G is a view for explaining a state of the cell skeleton portion shown in FIG. 2F.

FIG. 2H is an enlarged photograph showing further in detail a state in which a second through-hole is formed in the cell skeleton portion shown in FIG. 2F.

FIG. 2I is a view for explaining a configuration of the cell skeleton portion and second through-hole shown in FIG. 2H.

FIG. 3 is a flow chart showing an example of construction of the refrigerator shown in FIG. 1A.

FIG. 4 is a flow chart of construction of a refrigerator including a heat-insulating box according to Embodiment 2 of the present invention.

FIG. 5 is a front view of a refrigerator including a heat-insulating box according to Embodiment 3 of the present invention.

FIG. 6 is a sectional view of a gas adsorption device shown in FIG. 5.

FIG. 7 is a view showing results of a performance test of the open-cell urethane foam and presence/absence of first and second through-holes.

FIG. 8A is a photograph showing a state in which a second through-hole is formed in a cell skeleton portion in Example 1 in FIG. 7.

FIG. 8B is a photograph obtained by enlarging the photograph of FIG. 8A.

FIG. 8C is a photograph showing a state in which a second through-hole is formed in a cell skeleton portion in Example 2 in FIG. 7.

FIG. 8D is a photograph obtained by enlarging the photograph of FIG. 8C.

FIG. 8E is a photograph showing a cell skeleton portion and a powder in Comparative Example 1 in FIG. 7.

FIG. 8F is a photograph obtained by enlarging the photograph of FIG. 8E.

FIG. 9 is a sectional view for explaining integral foaming/molding of the heat-insulating box shown in FIG. 1A.

FIG. 10 is a sectional view for explaining integral foaming/molding of a heat-insulating box according to Embodiment 4 of the present invention.

FIG. 11 is a sectional view showing a heat-insulating wall (heat-insulating box) according to another embodiment of the present invention.

FIG. 12 is a sectional view showing a heat-insulating box according to another embodiment of the present invention.

DESCRIPTION OF EMBODIMENTS (Findings Underlying the Invention)

The present inventors have conducted studies on a configuration of an open-cell resin body and a configuration of a skin layer of the open-cell resin body. As a result, the present inventors have found the following. The open-cell resin body is formed mainly of cells, cell film portions and cell skeleton portions. The cell film portion is a partition wall which is formed between a pair of adjacent cells and has a small thickness size. The cell skeleton portion is a partition wall which is formed between a plurality of pairs of adjacent cells and has a thickness size greater than that of the cell film portion. In the skin layer, the ratio of cell skeleton portions is higher than the ratio of cell film portions. Therefore, for securing continuous air permeability of the open-cell resin body including the skin layer, it does not suffice that the open-cell resin body merely has cells as in conventional techniques. That is, it is necessary that the cells be caused to communicate with one another via through-holes that extend through not only cell film portions but also cell skeleton portions.

Particularly in the skin layer, the space volume ratio of cells is relatively low, and there are a large number of cell skeleton portions. Therefore, such a new problem has been found that it is difficult to pierce the layer having a large thickness size and having a large number of cell skeleton portions.

In integral foaming in which an open-cell resin body is formed integrally with a heat-insulating box, the heat-insulating box is a skin material of the open-cell resin body. Therefore, processing for causing cells in the skin layer to communicate with one another cannot be performed after the open-cell resin body is formed. Thus, it has also been found that it is essential to cause cells to communicate with one another at the time of producing and foaming a resin that forms the open-cell resin body.

For example, when an open-cell urethane foam is foamed in an open space, a skin layer is hard to be generated. On the other hand, when an open-cell urethane foam is formed in a heat-insulating box as a closed space by integral foaming as in Patent Literature 1, generally urethane producing and foaming steps are carried out at the same time in a heat-insulating space in a heat-insulating box. In this case, a skin layer having a large number of cell skeleton portions in the vicinity of the heat-insulating box is inevitably generated. In this connection, Patent Literature 1 does not disclose a method for causing adjacent cells to communicate with each other by piercing the cell skeleton portion.

A residual gas is entrapped in independent cells that do not communicate with one another, and the residual gas is gradually released with elapse of time. Consequently, in a heat-insulating box in which a heat-insulating space is airtightly closed, the heat-insulating box is deformed or the heat-insulating properties are deteriorated by the released gas.

The present invention has been devised for solving the above-mentioned problem, and an object of the present invention is to provide a heat-insulating wall which can resist deterioration of heat-insulating properties and deformation as compared to conventional one by causing cells to communicate with one another, and a heat-insulating housing and a method for producing the same.

A heat-insulating wall according to a first aspect of the present invention includes: a wall body whose hollow portion is a heat-insulating space; and an open-cell resin body formed of a thermosetting resin, with which the heat-insulating space is filled by integral foaming, the open-cell resin body including: a plurality of cells; a cell film portion which is formed at a location where the cells are adjacent to one another; a cell skeleton portion which is formed at a location where the cells are adjacent to one another and which is formed in such a manner that a distance between the adjacent cells is greater than a thickness of the cell film portion; a first through-hole formed so as to extend through the cell film portion; and a second through-hole formed so as to extend through the cell skeleton portion, wherein the plurality of cells communicate with one another through the first through-hole and the second through-hole.

According to this configuration, the first through-hole extends through the cell film portion, and the second through-hole extends through the cell skeleton portion. A plurality of cells communicate with one another through the first through-hole and the second through-hole, and therefore cells are continuous throughout the open-cell resin body.

Accordingly, in a heat-insulating wall with an airtightly closed space filled with an open-cell urethane foam by integral foaming, deformation of the heat-insulating wall or deterioration of heat-insulating properties by a residual gas released from independent cells can be suppressed. As a result, a heat-insulating wall having high long-term reliability can be provided.

A heat-insulating wall according to a second aspect of the present invention is the heat-insulating wall according to the first aspect of the present invention, wherein the open-cell resin body includes a skin layer formed in the vicinity of the inner surface of the wall body, and a ratio of the cell skeleton portion to the cell film portion at the skin layer is higher than at the central part of the open-cell resin body.

According to this configuration, the second through-hole is also formed in the skin layer having a large number of cell skeleton portions, and therefore cells are continuous throughout the open-cell resin body.

A heat-insulating wall according to a third aspect of the present invention is the heat-insulating wall according to the first or second aspect of the present invention, wherein the open-cell resin body further includes a dispersed powder, and the second through-hole includes a void formed at an interface between the powder and the thermosetting resin that forms the open-cell resin body.

According to this configuration, the second through-hole is also formed by the powder in the cell skeleton portion in which the thickness of the resin is large.

A heat-insulating wall according to a fourth aspect of the present invention is the heat-insulating wall according to the third aspect of the present invention, wherein the powder is incompatible with the thermosetting resin.

According to this configuration, the powder and the thermosetting resin are hard to be adhered to each other, and therefore the second through-hole is effectively formed.

A heat-insulating wall according to a fifth aspect of the present invention is the heat-insulating wall according to the third or fourth aspect of the present invention, wherein the size of the powder is smaller than the size of the cell.

According to this configuration, the internal space in the open-cell resin body becomes fine, so that the heat-insulating properties of the open-cell resin body are improved.

A heat-insulating wall according to a sixth aspect of the present invention is the heat-insulating wall according to any one of the first to fifth aspects of the present invention, wherein the pressure of the heat-insulating space is lower than atmospheric pressure.

According to this configuration, the internal space in the open-cell resin body is decompressed, so that the heat-insulating properties of the open-cell resin body are improved.

A heat-insulating wall according to a seventh aspect of the present invention is the heat-insulating wall according to any one of the first to sixth aspects of the present invention, further including a gas adsorption device disposed in the heat-insulating space.

A heat-insulating wall according to an eighth aspect of the present invention is the heat-insulating wall according to the seventh aspect of the present invention, wherein the gas adsorption device includes an adsorbent that adsorbs a carbon dioxide gas, and the adsorbent includes ZSM-5 zeolite ion-exchanged with at least one of barium and strontium.

According to this configuration, the adsorbent absorbs a residual gas released from independent cells, and therefore the pressure of the inside of the open-cell resin body is kept low, so that the heat-insulating properties of the open-cell resin body are maintained.

A heat-insulating wall according to a ninth aspect of the present invention is the heat-insulating wall according to any one of the first to eighth aspects of the present invention, wherein the open-cell resin body includes one of an open-cell urethane foam and an open-cell phenol foam.

According to this configuration, the heat-insulating space can be filled with the open-cell resin body, so that the wall body is sufficiently supported by the open-cell resin body, and the heat-insulating properties of the heat-insulating wall are improved.

A heat-insulating housing according to a tenth aspect of the present invention includes one or more of the heat-insulating walls according to any one of the first to ninth aspects of the present invention.

According to this configuration, the heat-insulating housing includes the heat-insulating wall, and therefore deformation of the heat-insulating housing and deterioration of heat-insulating properties are suppressed, so that a heat-insulating housing having high long-term reliability can be provided.

A method for producing a heat-insulating housing according to an eleventh aspect of the present invention includes: forming a heat-insulating space using a wall body; and filling the heat-insulating space with a mixture of a plurality of polyols having different compositions, a polyisocyanate, a foaming agent and a powder, wherein a thermosetting urethane resin is formed by a polymerization reaction of the polyol mixture and the polyisocyanate, a plurality of cells are formed in the thermosetting urethane resin by the foaming agent, a first through-hole that extends through a cell film portion formed at a location where the cells are adjacent to one another is formed due to a difference in composition among a plurality of polyols in the polyol mixture, and a second through-hole that extends through a cell skeleton portion which is formed at a location where the cells are adjacent to one another and which is formed in such a manner that a distance between the adjacent cells is greater than a thickness of the bubble film portion is formed between the powder and the thermosetting urethane resin due to the powder being incompatible with the thermosetting urethane resin.

According to this configuration, only by filling the heat-insulating space with a polyol mixture, a polyisocyanate, a foaming agent and a powder, the heat-insulating space is filled with an open-cell urethane foam by integral foaming.

Embodiments of the present invention will be described below with reference to the drawings. Hereinafter, the same or equivalent elements will be given the same reference symbol throughout all the drawings, and duplicate explanations thereof will be omitted unless otherwise specified.

(Embodiment 1)
(Example of Structure of Refrigerator)
[Example of Structure of Refrigerator]
FIG. 1A is a front view of a refrigerator 20 including a heat-insulating box 21 according to Embodiment 1 of the present invention. FIG. 1B is a local sectional view showing a part of the refrigerator 20 taken along line A-A in FIG. 1A. In FIGS. 1A and 1B, the height direction of the refrigerator 20 is a vertical direction, the width direction of the refrigerator 20 is a horizontal direction, and the thickness direction of the refrigerator 20 is a longitudinal direction.

As shown in FIG. 1A, the refrigerator 20 includes the heat-insulating box 21, and a door (not illustrated) mounted on the heat-insulating box 21. The heat-insulating box 21 is a box-shaped container that is opened at the front, and has an internal space. The internal space is partitioned into, for example, a cooling compartment 26 on the upper side and a freezing compartment 27 on the lower side by a partition plate 25. A single-opening-type or double-opening-type rotary door (not illustrated) is attached on the heat-insulating box 21 so as to openably close the cooling compartment 26. A drawer-type door (not illustrated) is attached on the heat-insulating box 21 so as to openably close the freezing compartment 27 in the longitudinal direction. A refrigeration cycle (not illustrated) provided with a compressor, an evaporator and a condenser is attached on the refrigerator 20. The internal space of the refrigerator 20 is not necessarily partitioned into the cooling compartment 26 and the freezing compartment 27. For example, the internal space of the refrigerator 20 may be partitioned by a plurality of partition plates into storage compartments which are used for different purposes (cooling compartment, freezing compartment, ice-making compartment, vegetable compartment and so on).

The heat-insulating box 21 includes one or more heat-insulating walls. In this embodiment, the heat-insulating box 21 includes one heat-insulating wall, and therefore the heat-insulating wall has the overall shape of the heat-insulating box 21. For example, when the heat-insulating wall has a flat-plate shape, the box-shaped heat-insulating box 21 may be formed by combining a plurality of heat-insulating walls.

The heat-insulating box 21 includes a hollow wall body, and an open-cell urethane foam 4 with which the heat-insulating space in the wall body is filled. The open-cell urethane foam 4 forms a core material of a heat-insulating layer in the heat-insulating box 21. The wall body includes an outer box 2 and an inner box 3 stored in the outer box. For example, when the refrigerator has a complicated shape like a household refrigerator, the outer box 2 is formed of a metal (e.g. iron), and the inner box 3 is formed of a resin such as a hard resin (e.g. ABS (acrylonitrile butadiene styrene) resin). When the refrigerator has a simple shape like a refrigerator for business, both the outer box 2 and the inner box 3 may be formed of a metal. Further, both the outer box 2 and the inner box 3 may be formed of a resin. A space between the outer box 2 and the inner box 3, i.e. a hollow portion in the wall body is used as a heat-insulating space. The wall body is not necessarily formed of two components: the outer box 2 and the inner box 3 as long as it has a heat-insulating space at the inside thereof. For example, the wall body may be formed of one or three or more components.

On the back plate of the outer box 2 (back plate of refrigerator 20), for example, a urethane liquid injection port 5 is disposed at each of total four locations: an upper light part, an upper left part, a lower right part and a lower left part of the outer box 2. The urethane liquid injection port 5 is a gas communication port which extends through the back plate of the outer box 2 to establish communication between the heat-insulating space and the outside. The urethane liquid injection port 5 is used for injecting a raw material (urethane liquid) of the open-cell urethane foam 4. The urethane liquid injection ports 5 at four locations are horizontally symmetrically disposed at the back plate of the outer box 2. Urethane liquids injected from the urethane liquid injection ports 5 merge at substantially the central part of the heat-insulating space between the outer box 2 and the inner box 3 of the refrigerator 20. Hereinafter, a hollow portion of the refrigerator 20 at which urethane liquids injected from the urethane liquid injection ports 5 merge is referred to as a urethane foaming/merging portion 40a. The urethane foaming/merging portion 40a is circularly formed exclusively at one location, i.e. the central part of the refrigerator 20. The number and disposition of the urethane liquid injection ports 5 is not limited to the foregoing four locations as long as the urethane foaming/merging portion 40a is formed exclusively at one location, i.e. the central part.

A plurality of air holes 6 are intensively disposed at a location on the back plate of the inner box 3, which corresponds to the urethane foaming/merging portion 40a. The air hole 6 is a gas communication port which extends through the back plate of the inner box 3 to establish communication between the heat-insulating space and the outside. For example, the air hole 6 is used for discharging air in the heat-insulating space during injection of the urethane liquid and during foaming of the urethane liquid. A plurality of air holes 6 are also disposed at a location on the back plate of the inner box 3, which is closely adjacent to the urethane foaming/merging portion 40a.

[Example of Structure of Open-Cell Urethane Foam]

The open-cell urethane foam 4 is an open-cell resin body formed of a thermosetting resin (thermosetting urethane resin), and the heat-insulating space is filled with the open-cell urethane foam 4 by integral foaming in the heat-insulating space. Here, the "integral foaming" means that a raw material of the open-cell urethane foam 4 (urethane liquid) is injected into the heat-insulating space formed of at least a part of the wall body, and the raw material is foamed and solidified in the heat-insulating space. The integral foaming molded article is the heat-insulating box 21 integrally formed by sticking the open-cell urethane foam 4 to the wall bodies 2 and 3 as a skin material.

The open-cell urethane foam 4 retains a heat-insulating space between the outer box 2 and the inner box 3 by supporting the outer box 2 and the inner box 3 while thermally insulating the outer box 2 and the inner box 3 from each other. That is, the open-cell urethane foam 4 functions as a core material (core member). The porosity of the open-cell urethane foam 4 is, for example, 95% or more. As the porosity increases, the heat-insulating properties of the open-cell urethane foam 4 are improved, but the mechanical strength for supporting the outer box 2 and the inner box 3 is reduced. Thus, a porosity of the open-cell urethane foam 4 is determined in consideration of heat-insulating properties and mechanical strength.

FIG. 2A is a view schematically showing an example of a structure of the open-cell urethane foam 4 shown in FIG. 1A. As shown in FIG. 2A, the open-cell urethane foam 4 has a core layer 4a, and a skin layer 4b that covers the outer circumference of the core layer 4a. The core layer 4a includes a larger number of cells 47 as compared to the skin layer 4b (FIGS. 2B and 2C), and therefore has a density lower than that of the skin layer 4b. The core layer 4a is situated at the central part of the open-cell urethane foam 4. The skin layer 4b is formed in the vicinity of the inner surfaces of the outer box 2 and the inner box 3.

FIG. 2B is an enlarged photograph showing a state between a pair of cells 47 in the open-cell urethane foam 4 shown in FIG. 2A. FIG. 2C is a view for explaining a configuration between a pair of cells 47 shown in FIG. 2B. The core layer 4a and the skin layer 4b shown in FIG. 2A include a plurality of cells 47, cell film portions 42 and cell skeleton portions 43 as shown in FIGS. 2B and 2C, respectively. The ratio of cell film portions 42 is greater in core layer 4a than in the skin layer 4b. The ratio of cell skeleton portions 43 is greater in the skin layer 4b, in which foaming is less sufficient, than in the core layer 4a. Thus, the ratio of cell skeleton portions 43 to cell film portions 42 is higher in the skin layer 4b than in the core layer 4a.

The cell 47 is a fine cell of, for example, less than 1000 μm as shown in FIGS. 2B and 2C. Cells 47 communicate with one another through the later-described first through-hole 44 and second through-hole 45, and therefore cells 47 are continuous. As cells 47 become smaller and more continuous, the length of the heat transfer route in the open-cell urethane foam 4 increases to improve the heat-insulating properties of the open-cell urethane foam 4 as long as the density of the open-cell urethane foam 4 is fixed.

However, as the size of the cell 47 decreases, the fluid resistance (exhaust resistance) at the time of decompressing the internal space of cells 47 etc. in the open-cell urethane foam 4 increases, leading to an increase in power and time for exhausting air. Accordingly, a size of the cell 47 is determined in consideration of the heat-insulating properties and exhaust efficiency of the open-cell urethane foam 4.

The cell film portion 42 is formed at a location where cells 47 are closely adjacent to one another, and formed in a film shape between a pair of cells 47 facing each other. The thickness of the cell film portion 42 (distance between two cells 47 with the cell film portion 42 sandwiched therebetween) is, for example, as small as about 3 μm as typically shown in the right upper part and the left lower part of FIGS. 2B and 2C.

The cell skeleton portion 43 is formed at a location where cells 47 are adjacent to one another as typically shown in the central part of FIGS. 2B and 2C. The thickness of the cell skeleton portion 43 (distance between a pair of cells 47) is larger than that of the cell film portion 42, and is, for example, as large as about 150 μm (FIGS. 2F and 2G). Thus, cell skeleton portion 43 is formed among a plurality pairs of cells 47 facing one another. The cell film portion 42 between a pair of cells 47 and the cell film portion 42 between another pair of cells 47 are continuous at the cell skeleton portion 43.

Here, according to the definition the "cell film portion" and "cell skeleton portion", a region which does not belong either to the "cell film portion" or the "cell skeleton portion" may exist in the open-cell urethane foam 4 due to variations in state of foaming. The open-cell urethane foam 4 may include a region where foaming is insufficient. Such a region may have a state in which cells 47 are dispersed in a bulk resin.

The first through-hole extends through the cell film portion 42, and the second through-hole extends through the cell skeleton portion 43. Consequently, in the open-cell urethane foam 4, all cells 47 communicate with one another. All cells 47 are not necessarily exactly all the cells 47 existing in the open-cell urethane foam 4. A very small number of cells 47 that do not communicate with one another may remain due to variations in state of foaming, etc. as described above.

FIG. 2D is an enlarged photograph showing a state of the first through-hole 44 in the cell film portion 42 in FIG. 2B.

FIG. 2E is a view for explaining a configuration of the cell film portion 42 and first through-hole 44 shown in FIG. 2D.

The first through-hole 44 extends through the cell film portion 42 as shown in FIGS. 2D and 2E. FIGS. 2D and 2E show a surface of the cell film portion 42 (interface between the cell 47 and the cell film portion 42) as seen from the inside of the cell 47.

The first through-hole 44 causes mutually closely adjacent cells 47 to communicate with one another. For example, the first through-hole 44 is formed as distortion occurs at a molecular level as a result of performing foaming by using a plurality of polyols having different compositions as described later.

FIG. 2F is an enlarged photograph showing a state of the cell skeleton portion 43 in FIG. 2B. FIG. 2G is a view for explaining a configuration of the cell skeleton portion 43 shown in FIG. 2F. FIG. 2H is an enlarged photograph showing further in detail a state of the cell skeleton portion 43 shown in FIG. 2F. FIG. 2I is a view for explaining a configuration of the cell skeleton portion 43 shown in FIG. 2H.

As shown in FIGS. 2H and 2I, the second through-hole 45 is formed at an interface between a powder 46 and a thermosetting urethane resin (thermosetting resin) that forms the open-cell urethane foam 4. The second through-hole 45 extends through the cell skeleton portion 43 to cause mutually separately adjacent cells 47 to communicate with one another. The diameter size and length size of the second through-hole 45 are greater than the diameter size and length size of the first through-hole 44. For example, the second through-hole 45 is formed as the incompatible powder 46 is not adhered to the urethane resin.

(Method for Producing Heat-Insulating Box)

When the heat-insulating box 21 of the refrigerator 20 is produced, first the outer box 2 and the inner box 3 are assembled to provide a wall body as shown in FIG. 1A. A urethane liquid is injected into the heat-insulating space from the urethane liquid injection port 5 of the wall body. The urethane liquid is a raw material of the open-cell urethane foam 4 obtained by mixing thermosetting urethane resin components (first resin component and second resin component), a foaming agent and the powder 46.

The first resin component is, for example, a mixture of first, second and third polyols described later. The polyol mixture includes, for example, 10 to 40% by weight of the first polyol, 10 to 50% by weight of the second polyol and 25 to 65% by weight of the third polyol. The hydroxyl value of the polyol mixture is, for example, 200 to 500 mg KOH/g, and is particularly preferably 230 to 450 mg KOH/g. When the average hydroxyl value of the polyol mixture is more than 500 mg KOH/g, proper open cells can not be obtained. On the other hand, when the average hydroxyl value of the polyol mixture is less than 200 mg KOH/g, a required strength as the heat-insulating box 21 cannot be achieved even through the density of the open-cell urethane foam 4 is increased.

For the first polyol, a polyoxyalkylene polyol having an average functional group number of 2 to 3.5, and a hydroxyl value of 25 to 60 mg KOH/g, preferably 28 to 50 mg KOH/g is used. The polyoxyalkylene polyol has a polyoxyethylene unit content of 5% by weight or less. The polyoxyalkylene polyol has a terminal primary hydroxyl group amount of 15% or less of the amount of hydroxyl groups of the polyol. For the first polyol, two or more polyols may be mixed and used in combination.

The first polyol is preferably a propylene oxide adduct with a polyhydric alcohol as an initiator, i.e. a polyoxypropylene polyol. The first polyol is produced by addition-polymerizing an alkylene oxide such as propylene oxide with an initiator. In the addition polymerization, the hydroxyl value is adjusted to fall within a range of 25 to 60 mg KOH/g.

For the initiator, a polyhydric alcohol having an average functional group number of 2 to 3.5 is used. For the polyhydric alcohol, for example, di- to trifunctional polyhydric alcohols such as propylene glycol, dipropylene glycol, glycerin and trimethylolpropane are used alone, or approximately mixed and used. The polyhydric alcohol can also be obtained by appropriately mixing tetra- or more functional polyhydric alcohols such as pentaerythritol, diglycerin, methyl glucoside, sorbitol and sucrose with the di- to trifunctional polyhydric alcohols, and adjusting the mixture so as to have an average functional group number of 3.5 or less.

When the first polyol has a hydroxyl value of more than 60 mg KOH/g, or a polyethylene content of more than 5% by weight, or a terminal primary hydroxyl group amount of more than 15% of the amount of hydroxyl groups, a proper open-cell hard polyurethane foam cannot be obtained. On the other hand, it is difficult to produce a polyol which has a hydroxyl value of less than 25 mg KOH/g and does not contain polyoxyethylene.

The polyol mixture includes the first polyol in an amount of 10 to 40% by weight, preferably 15 to 35% by weight. When the amount of the first polyol is less than 10% by weight in the polyol mixture, a hard polyurethane foam having proper open cells cannot be obtained. On the other hand, when the amount of the first polyol is more than 40% by weight, there is the following problem. For example, when the polyol mixture is used as a premix, there arises a problem of separation of various components.

For the second polyol, a polyoxyalkylene polyol having an average functional group number of 2 to 4, and a hydroxyl value of 200 to 300 mg KOH/g is used. The second polyol is produced by addition-polymerizing an alkylene oxide such as propylene oxide with an initiator so that the second polyol has a hydroxyl value of 200 to 300 mg KOH/g. The initiator is a non-amine, preferably a polyhydric alcohol having an average functional group number of 2 to 4.

As the polyhydric alcohol having an average functional group number of 2 to 4, for example, di- to tetrafunctional polyhydric alcohols such as propylene glycol, dipropylene glycol, glycerin, trimethylolpropane, pentaerythritol, diglycerin and methyl glucoside are used alone, or approximately mixed and used. Further, the polyhydric alcohol having an average functional group number of 2 to 4 is obtained by appropriately mixing penta- or more functional polyhydric alcohols such as sorbitol and sucrose with the di- to tetrafunctional polyhydric alcohols, and adjusting the mixture so as to have an average functional group number of 4 or less.

The second polyol is preferably a propylene oxide adduct to at least one polyhydric alcohol selected from propylene glycol, glycerin and trimethylolpropane. For the second polyol, two or more polyols can be used in combination.

The second polyol is useful for the polyol mixture and premix to exist uniformly without impairing the performance of open cells. That is the first polyol and the third polyol have mutually low compatibility. However, the second polyol can ensure that the first and third polyols uniformly and stably exist without being separated not only in a polyol mixture but also in a premix obtained by blending a catalyst, a foam stabilizer, a foaming agent and the like with a polyol mixture.

The polyol mixture includes the second polyol in an amount of 10 to 50% by weight, preferably 15 to 45% by weight. When the content of the second polyol is less than 10% by weight in the polyol mixture, it is difficult to uniformly and stably obtain a polyol mixture or premix. On the other hand, when the content of the second polyol is more than 50% by weight, the obtained open-cell urethane foam 4 has insufficient strength and insufficient heat resistance.

For the third polyol, a polyoxyalkylene polyol having an average functional group number of 2 to 6, and a hydroxyl value of more than 300 mg KOH/g and not more than 840 mg KOH/g is used. The amount of terminal primary hydroxyl groups is 15% or less of the amount of hydroxyl groups of the polyol. The third polyol includes, for example, dipropylene glycol and tripropylene glycol.

The third polyol is produced by addition-polymerizing an alkylene oxide such as propylene oxide with an initiator so that the third polyol has a hydroxyl value of more than 300 mg KOH/g and not more than 840 mg KOH/g. For the initiator, a non-amine, preferably a polyhydric alcohol having an average functional group number of 2 to 6 is used alone or as an appropriate mixture. The polyhydric alcohol having an average functional group number of 2 to 6 is, for example, propylene glycol, dipropylene glycol, glycerin, trimethylolpropane, pentaerythritol, diglycerin, methyl glucoside, sorbitol, sucrose or the like.

Particularly, for the third polyol, a polyoxyalkylene polyol having an average functional group number of 2.5 to 6, and a hydroxyl value of more than 300 mg KOH/g and not more than 550 mg KOH/g is preferably used. The polyoxyalkylene polyol has a primary hydroxyl group amount of 15% or less of the amount of hydroxyl groups of the polyol, and is preferably a polyoxypropylene polyol.

As the third polyol, a polyoxypropylene polyol with sorbitol or glycerin as an initiator can be used. This is preferred from the viewpoint of suppressing scorch during generation of a foam. Most preferably, a polyoxyalkylene polyol, particularly a mixture of a polyoxypropylene polyol and dipropylene glycol or tripropylene glycol is used. This polyoxyalkylene polyol has an average functional group number of 2.5 to 6, and a hydroxyl value of more than 300 mg KOH/g and not more than 550 mg KOH/g, and uses a polyhydric alcohol as an initiator. Thus, use of dipropylene glycol or tripropylene glycol as a part of the third polyol is advantageous in that the compatibility and stability of the polyol mixture is improved.

The polyol mixture includes the third polyol in an amount of 25 to 65% by weight, preferably 25 to 55% by weight. When the amount of the third polyol is less than 25% by weight in the polyol mixture, the obtained open-cell polyurethane foam 4 is poor in strength. On the other hand, when the content of the third polyol is more than 65% by weight, proper open cells cannot be obtained in the open-cell urethane foam 4.

The second resin component is a polyisocyanate. As the isocyanate, for example, a polymethylene polyphenyl polyisocyanate is used. The polymethylene polyphenyl polyisocyanate reacts at an isocyanate index of 70 to 150. The isocyanate index is defined by (actually used amount of polyisocyanate)/theoretical amount of polyisocyanate)×100. The theoretical amount of polyisocyanate is an amount required for reaction of a compound having active hydrogen, such as a polyol, a monool or water, with the active hydrogen.

The polyisocyanate is preferably a polymethylene polyphenyl polyisocyanate (crude MDI, C-MDI, polymeric MDI). Further, the viscosity of the polymethylene polyphenyl polyisocyanate at 25° C. is preferably 200 millipascal-second (centipoise) or less. When the viscosity at 25° C. is 200 millipascal-second or less as described above, compatibility with the polyol mixture is satisfactory, so that open cells are easily formed in the open-cell urethane foam 4. The isocyanate index of such a polymethylene polyphenyl polyisocyanate is 70 to 150, preferably 80 to 130. When the isocyanate index is excessively high, closed cells are easily formed although the hardness of the open-cell urethane foam 4 is high. On the other hand, when the isocyanate index is excessively low, the open-cell urethane foam 4 has poor strength.

Specific examples of the polymethylene polyphenyl polyisocyanate include, as commercial products, LUPRANATE M-20S (viscosity at 25° C.: 180 millipascal-second (centipoise)) and LUPRANATE M-12S (viscosity at 25° C.: 120 millipascal-second (centipoise)) (manufactured by Takeda Badische Urethane Industry Co., Ltd.), MILLIONATE MR-200 (manufactured by Nippon Polyurethane Industry Co., Ltd.), SUMIDUR 44V-20 and 44V-10 (manufactured by Sumitomo Bayer Urethane Co., Ltd.) and PUPPY 135 (manufactured by Dow Mitsubishi Chemical Ltd.).

For example, water is used for the foaming agent. The amount of water is 0.5 to 5.5 parts by weight, preferably 1.0 to 4.5 parts by weight based on 100 parts by weight of the polyol mixture. When the blending amount of water is small, it is difficult to obtain the open-cell urethane foam 4, and the density of the open-cell urethane foam 4 becomes excessively high. On the other hand, when the blending amount of water is excessively large, the density of the open-cell urethane foam 4 becomes excessively low, so that it is difficult to achieve a compressive strength of 1 kg/cm$^2$ or more (when compressed by 10%). A low-boiling-point liquid such as a halogenated hydrocarbon or pentane may be used as a foaming agent together with water as necessary.

The powder 46 is a fine powder that is dispersed in the open-cell urethane foam 4. The particle size of the powder 46 is smaller than that of the cell 47, for example less than 1000 μm, particularly preferably, for example 10 to 30 μm. The powder 46 is incompatible with the resin of the open-cell urethane foam 4, and has a SP value of, for example, 9.5 or less. For the powder 46, a polyethylene (PE), nylon (Ny-12) or the like is used. The SP value of the urethane resin (resin of open-cell urethane foam 4) is, for example, 10 to 11. Thus, the urethane resin and the powder 46 are harder to be adhered to each other as the difference between the SP value of the urethane resin and the SP value of the powder 46 becomes greater. Consequently, the second through-hole 45 is formed between the urethane resin and the powder 46.

A foam stabilizer may be added to the urethane liquid. For the foam stabilizer, a general organic polysiloxane copolymer for hard foam is used. Examples of the foam stabilizer include B-8404 and B-8017 manufactured by Goldschmidt Co., Ltd., L-5410, L-5420, SZ-1127 and L-582 manufactured by Nippon Unicar Company Ltd., SH-190, SH-192 and SH-193 manufactured by Dow Corning Toray Co., Ltd. and F-345, F-341 and F-242T manufactured by Shin-Etsu Chemical Co., Ltd. The added amount of the foam stabilizer is, for example, 0.2 to 10 parts by weight, preferably 0.5 to 3 parts by weight based on 100 parts by weight of the polyol mixture.

Further, a catalyst may be added to the urethane liquid. As the catalyst, an amine-based catalyst, a tin-based catalyst, a lead-based catalyst or the like is used, and a tertiary amine is preferably used. Examples of the tertiary amine include tetramethyl hexanediamine (TMHDA, KAOLIZER No. 1 (manufactured by Kao Corporation), TOYOCAT MR (manufactured by TOSOH CORPORATION)), pentamethyl diethylenetriamine (PMDETA, KAOLIZER No. 3 (manufactured by Kao Corporation)), Dabco 33LV (manufactured by Air Products and Chemicals, Inc.) and bis(2-dimethylaminoethyl)ether (TOYOCAT ET (manufactured by TOSOH CORPORATION)). They are used alone or used in mixture. Particularly, a mixture of TMHDA/bis(2-dimethylaminoethyl)ether (7/3) (hereinafter, referred to TE-30) is preferred. In this embodiment, the added amount of the catalyst is, for example, 0.01 to 20% by weight based on 100 parts by weight of polyisocyanate.

Additives such as a flame retardant, an antioxidant, a colorant and a viscosity-reducing agent may be added to the urethane liquid as necessary. As the flame retardant, trischloropropyl phosphate (TCPP) is used. Examples of the viscosity-reducing agent include propylene carbonate. Further, a small amount of a low-viscosity diol or monool is used as necessary.

[Example of Construction of Refrigerator]

FIG. 3 is a flow chart showing an example of construction of the refrigerator 20 shown in FIG. 1A. As shown in FIG. 3, the inner box 3 and the outer box 2 are independently prepared for the heat-insulating box (heat-insulating housing) 21 of the refrigerator 20.

For the inner box 3, first a hard resin such as an ABS resin is molded into a sheet (step: S301). This hard resin sheet is vacuum-molded into the inner box 3 having a desired box shape (step: S302). Specifically, hard resin sheet is heated, and the sheet is pressed against a mold of the inner box 3 before the softened sheet is cooled and solidified. Air is released from a hole of the mold to bring the inside of the mold into a vacuum state, so that the sheet is caused to come into close contact with the mold. Consequently, a desired box shape as the inner box 3 is obtained.

Next, the back plate of the box-shaped inner box 3 is punched by a trimming punch to form the air hole 6 at each location where the air hole 6 is to be disposed as shown in FIG. 1A (step: S303). Predetermined components for the refrigerator 20, which should be attached to the inner box 3 before the inner box 3 and the outer box 2 are combined, are attached to the inner box 3 (step: S304).

For the outer box 2, a metallic steel plate is provided (step: S305). The steel plate is punched by a trimming punch to form the urethane liquid injection port 5 at each location where the urethane liquid injection port 5 is to be disposed as shown in FIG. 1A (step: S306). The steel plate after punching is subjected to press molding such as bending to mold the steel plate into a desired box shape as the outer box 2 (step: S307). Predetermined components for the refrigerator 20, which should be attached to the outer box 2 before the inner box 3 and the outer box 2 are combined, are attached to the outer box 2 (step: S308).

The inner box 3 and the outer box 2 prepared as described above are combined to form a wall body (step: S309). Specifically, a flange formed at the front part of the side surface of the inner box 3 is fitted in a groove portion formed at the front part of the side surface of the outer box 2. Consequently, the inner box 3 is mounted in the outer box 2 to form a hollow wall body, and this internal space is formed as a heat-insulating space. Predetermined components for the refrigerator 20, which should be attached before the heat-insulating space is filled with the open-cell urethane foam 4, are attached to wall bodies 2 and 3 (step: S310).

Next, the open-cell urethane foam 4 is subjected to integral foaming/molding in the heat-insulating space between the outer box 2 and the inner box 3 (step: S311). The integral foaming/molding will be described with reference to FIG. 9. FIG. 9 is a sectional view for explaining integral foaming/molding of the heat-insulating box 21 using a urethane foaming tool 41a. Two urethane liquid injection ports 5 in FIG. 9 represent two urethane liquid injection ports 5 at upper and lower locations on the right side as shown in FIG. 1A. As shown in FIG. 9, the two urethane liquid injection ports 5 are situated at the rear side from each of urethane liquid reservoir portions 40b at three locations. For two urethane liquid injection ports 5 at upper and lower locations on the left side as shown in FIG. 1A, a urethane liquid is injected similarly to the urethane liquid injection ports 5 on the right side.

The urethane foaming tool 41a is a tool for supporting wall bodies 2 and 3 during integral foaming/molding, and includes, for example, a first tool 41a1 and a second tool 41a2. The first tool 41a1 is provided with a depression so as to support the wall body on the outer box 2 side. The depression has a shape conforming to the rear surface of the outer box 2, i.e. a shape corresponding to the rear surface of the heat-insulating box 21. The first tool 41a1 is provided with a perforation 41a3 at a position which corresponds to the urethane liquid injection port 5 of the outer box 2 when the box is fitted in the depression. Consequently, the heat-insulating space can communicate with the outside through the urethane injection port 5 and the perforation 41a3 even when wall bodies 2 and 3 are covered with the urethane foaming tool 41a. The second tool 41a2 is provided with a depression so as to support the wall body on the inner box 3 side. The depression has a shape conforming to the front surface of the inner box 3, i.e. a shape corresponding to the front surface of the heat-insulating box 21 including the partition plate 25. The second tool 41a2 is provided with a perforation (not illustrated) at a position which corresponds to the air hole 6 of the inner box 3 when the box is fitted in the depression. Consequently, the heat-insulating space can communicate with the outside through the air hole 6 and the perforation even when wall bodies 2 and 3 are covered with the urethane foaming tool 41a.

When the urethane foaming tool 41a is used to perform integral foaming/molding, first the wall body is covered with the first tool 41a1 such that the inner box 3 side of the wall body is fitted in the depression of the second tool 41a2 and the outer box 2 side of the wall body is fitted in the depression of the first tool 41a1. Consequently, the entire surface of the wall body is supported by the urethane foaming tool 41a, so that the wall body can be prevented from being deformed at the time of filling and foaming of the urethane liquid.

The urethane liquid injection port 5 communicates with the perforation 41a3, and the air hole 6 communicates with the perforation of the second tool 41a2. Thus, the tip of a liquid feeding hose 41 of a urethane liquid feeding device 40 is connected to the urethane liquid injection port 5 through the perforation 41a3. The urethane liquid is injected to each of the urethane liquid injection ports 5 at two locations from the urethane liquid feeding device 40 through the liquid feeding hose 41. The amounts of urethane liquids that fed to the urethane liquid injection ports 5 at two locations may be the same, or may be individually adjusted so that the heat-insulating space is filled with the urethane liquid uniformly.

The urethane liquid flows into the heat-insulating space from each of the urethane liquid injection ports 5 at two locations, flows into urethane liquid reservoir portions 40b at three locations on the front side from the urethane liquid injection ports 5, and is stored in the urethane liquid reservoir portions 40b. The components of the urethane liquid are mixed, and a polyol mixture as the first resin component and a polyisocyanate as the second resin component undergo a polymerization reaction to form a thermosetting urethane resin. The foaming agent is vaporized by heat generated in the polymerization reaction, so that cells 47 are formed in the urethane resin. A plurality of polyols having different compositions cause distortion at a molecular level, so that the first through-hole 44 is formed in the cell film portion 42 as shown in FIGS. 2D and 2E. Further, as shown in FIGS. 2H and 2I, the second through-hole 45 is formed between the thermosetting urethane resin and the powder 46, and the second through-hole 45 extends through the cell skeleton portion 43. In this manner, the open-cell urethane foam 4 is formed.

At this time, as shown in FIG. 9, the open-cell urethane foam 4 expands from each urethane liquid reservoir portion 40b toward the urethane liquid injection port 5 while thrusting aside air existing in the heat-insulating space, and is formed into a solid phase. The open-cell urethane foam 4 moves toward the rear side from each of the urethane liquid reservoir portions 40b at three locations, merges at the urethane foaming/merging portion 40a, and fills the heat-insulating space uniformly. The thrust air merges at the urethane foaming/merging portion 40a, and is exhausted from the urethane foaming/merging portion 40a through the air hole 6 (FIG. 1A). Thus, during filling of the open-cell urethane foam 4, generation of an air reservoir portion in the heat-insulating space is prevented, so that formation of a portion, which is not unfilled with the open-cell urethane foam 4, is suppressed.

Next, a molded article with the heat-insulating space filled with the open-cell urethane foam 4 is taken out from the urethane foaming tool 41a, and each air hole 6 present in the inner box 3 of the wall body is sealed as shown in FIG. 3 (step S312). Remaining components for the refrigerator 20 are attached to wall bodies 2 and 3 in the refrigerator 20 (step S313). Each urethane liquid injection port 5 in the outer box 2 of the wall body is sealed (step S314). In this way, the refrigerator 20 is produced.

Timing at which the inner box 3 and the outer box 2 are fixed is not particularly limited. For example, the inner box 3 and the outer box 2 may be fixed by a sticking member, an adhesive or the like at the time of combining the inner box 3 and the outer box 2 (step: S309). Alternatively, the inner box 3 and the outer box 2 may be fixed at the time of sealing the urethane liquid injection port 5 (step S314).

Sealing of the urethane liquid injection port 5 can be performed by, for example, bonding a sheet-shaped urethane liquid injection port sealing material or mechanically sticking a disc-shaped urethane liquid injection port sealing material using a fixation member.

[Effects]

In the heat-insulating box 21 having the configuration described above, the first through-hole 44 is formed in the cell film portion 42 by using for the urethane liquid a mixture of a plurality of polyols having different compositions, and a pair of cells 47 with the cell film portion 42 sandwiched therebetween are communicate with each other through the first through-hole 44. By blending with the urethane liquid the powder 46 having low compatibility with the urethane foam, the second through-hole 45 is formed in the cell skeleton portion 43, and a pair of cells 47 with the cell skeleton portion 43 sandwiched therebetween are communicate with each other through the second through-hole 45. Thus, all or almost all cells 47 in the open-cell urethane foam 4 communicate with one another in the heat-insulating box 21. As a result, there exist no or very few closed cells in the open-cell urethane foam 4. Accordingly, the amount of a residual gas released from closed cells is small even after elapse of a long period of time after the air hole 6 and the urethane liquid injection port 5 are sealed to airtightly close the heat-insulating space. Thus, deformation of the heat-insulating box 21 by a residual gas can be prevented.

The heat-insulating housing 21 is airtightly closed by sealing the air hole 6 and the urethane liquid injection port 5 after formation of the open-cell urethane foam 4. Consequently, ingress of air into the heat-insulating space from outside can be prevented. Accordingly, ingress of moisture contained in air is restrained, so that degradation of the open-cell urethane foam 4 in the heat-insulating space by moisture can be suppressed. As a result, the heat-insulating wall and heat-insulating box 21 having high long-term reliability can be provided.

The diameter size of the powder 46 is smaller than the size of the cell 47, and therefore the size of the second through-hole 45 in the long direction is smaller than the size of the cell 47. The first through-hole 44 is formed in the filmy cell film portion 42 having a small thickness, and therefore the size of the first through-hole 44 in the long direction is smaller than the size of the cell 47. Further, the first and second through-holes 44 and 45 communicate with cells 47, and therefore the diameter size of each of the first and second through-holes 44 and 45 is smaller than the size of the cell 47. Accordingly, the size of the internal space of the open-cell urethane foam 4, i.e. cells 47 and the first and second through-holes 44 and 45, is small, so that the heat-insulating box 21 has excellent heat-insulating properties.

Further, the open-cell urethane foam 4 formed of a thermosetting resin can exhibit higher heat-insulating properties even in a wall body having a complicated shape as compared to a resin foam formed of a thermoplastic resin. Specifically, a resin foam formed of a thermoplastic resin is formed by foaming a thermoplastic resin after packing a heat-insulating space in a wall body with particles of thermoplastic resin. Therefore, it is difficult to uniformly fill a complicated ordinary heat-insulating space with particles of thermoplastic resin. Consequently, the resin foam formed of a thermoplastic resin does not come into close contact with a wall body, and therefore a void is formed. The void deteriorates the heat-insulating properties of the heat-insulating wall of the resin foam. The void reduces a force of the resin foam to support the wall body, so that the porosity of the inside of the resin foam cannot be increased, and therefore the heat-insulating properties of the heat-insulating wall of the resin foam are deteriorated.

On the other hand, in the open-cell urethane foam 4 formed of a thermosetting resin, an urethane liquid formed by blending a mixture of a plurality of polyols having different compositions, a polyisocyanate, a foaming agent and the powder 46 is used. The urethane liquid has liquid raw materials except for the powder 46, and the size of the powder 46 is very small. Thus, when the urethane liquid is injected into the heat-insulating space, the heat-insulating space can be uniformly filled with the liquid raw material even though the heat-insulating space has a complicated shape. Thus, the open-cell urethane foam 4 formed corresponds to the shape of the heat-insulating space, and comes into close contact with the wall body (outer box 2 and inner box 3). Accordingly, a force of the open-cell urethane foam 4 to support wall bodies 2 and 3 is high, so that the porosity of the open-cell urethane foam 4 can be increased. As a result, the heat-insulating properties of the heat-insulating box 21 formed of the open-cell urethane foam 4 is improved, and the weight of the heat-insulating box 21 can be kept small.

(Embodiment 2)

A heat-insulating box 21 according to Embodiment 2 of the present invention is formed by evacuating a heat-insulating space after forming in the heat-insulating space an open-cell urethane foam 4 shown in FIG. 1A. Consequently, the pressure of the heat-insulating space is lower than atmospheric pressure, so that the heat-insulating space is in a vacuum state. The vacuum state includes a state in which the pressure of the heat-insulating space is lower than atmospheric pressure.

In the heat-insulating box 21 according to Embodiment 2, the urethane liquid injection port 5 in Embodiment 1 is used also as an exhaust hole to which a vacuum pump for evacuation is connected. Therefore, the example of a structure of the heat-insulating box 21 shown in FIGS. 1A and 1B can be applied to the heat-insulating box 21 according to Embodiment 2.

FIG. 4 is a flow chart of construction of a refrigerator 20 including the heat-insulating box 21 according to Embodiment 2. Treatments in steps S1006, S1013 and S1014 shown in FIG. 4 are different from treatments in steps S306, S313 and S314 shown in FIG. 3. Treatments in steps S1001 to S1014 shown in FIG. 4, i.e. steps other than steps S1006, S1012 and S1014, are similar, respectively, to treatments in steps S301 to S314 shown in FIG. 3, i.e. steps other than steps S306, S312 and S314. Therefore, descriptions of these similar steps are omitted.

In the treatment in step S1006 shown in FIG. 4, a steel plate is punched by a trimming punch to form an urethane liquid injection port 5, which has a hole diameter of 30 (mm) and is used also as an exhaust hole, at each location where the urethane liquid injection port 5 is to be disposed as shown in FIG. 1A.

In the treatment in step S1013, a vacuum pump is connected to the urethane liquid injection port 5 used also as an exhaust hole after an air hole 6 is sealed. The heat-insulating space filled with the open-cell urethane foam 4 is evacuated and thereby decompressed, and components for a refrigerator 20 are then attached to the heat-insulating box 21. Finally, in the treatment in step S1014, the urethane liquid injection port 5 used also as an exhaust hole is sealed. By sealing the urethane liquid injection port 5 used also as an exhaust hole as described above, the heat-insulating space filled with the open-cell urethane foam 4 can be kept in a vacuum state.

The method for sealing the urethane liquid injection port 5 used also as an exhaust hole is not particularly limited. For example, a sheet-shaped urethane liquid injection port sealing material may be bonded to the urethane liquid injection port 5 by an adhesive or the like. Further, a sheet-shaped urethane liquid injection port sealing material may be mechanically stuck to the urethane liquid injection port 5 by a fixation member. A urethane liquid injection port sealing material having a pinch portion, the tip of which can be sealed, may be attached to the urethane liquid injection port 5.

An exhaust hole may be disposed independently of the urethane liquid injection port 5 rather than using the urethane liquid injection port 5 also as an exhaust hole. This method for sealing the urethane liquid injection port 5 can be applied to a method for sealing the exhaust hole.

(Embodiment 3)

In a heat-insulating box 21 according to Embodiment 3 of the present invention, a gas adsorbing device 85 (adsorbent) that adsorbs a carbon dioxide gas etc. in an open-cell urethane foam 4 is disposed in a heat-insulating space as shown in FIG. 5. FIG. 5 is a front view of a refrigerator 20 including a heat-insulating box 21 according to Embodiment 3 of the present invention.

One gas adsorption device 85 is disposed in the heat-insulating space on both side surfaces of a freezing compartment 27 on the lower left side and the lower right side of the heat-insulating box 21 shown in FIG. 5. Consequently, since the cooling retention temperature of the freezing compartment 27 is lower than that of a cooling compartment 26, a gas in the heat-insulating space moves into the heat-insulating space on the circumference of the freezing compartment 27, so that the gas can be efficiently adsorbed by the gas adsorption device 85. Of course, the disposition and number of gas adsorption devices 85 can be changed according to a size and form of the refrigerator 20, and the number and disposition thereof is not limited to the two locations described above.

FIG. 6 is one example of a sectional view of the gas adsorption device 85. As shown in FIG. 6, the gas adsorption device 85 includes a gas adsorption substance 86, and a storage container 87 having an opening 88 for storing the gas adsorption substance 86.

The gas adsorption substance 86 plays the role of adsorbing gases such as water vapor, air and a carbon dioxide gas which remain in the closed space or enter the closed space. Examples of the gas adsorption substance 86 that can be used include, but are not particularly limited to, chemical adsorption substances such calcium oxide and magnesium oxide, physical adsorption substances such as zeolite, and mixtures thereof A copper-ion-exchanged ZSM-5 type zeolite having both chemical adsorptivity and physical adsorptivity can also be used as the gas adsorption substance 86. The ZSM-5 type zeolite has a particularly high nitrogen adsorbing capability at a pressure lower than atmospheric pressure, and therefore can strongly adsorb nitrogen at the time of ingress of air.

Further, an adsorbent that adsorbs a carbon dioxide gas, for example a ZSM-5 zeolite ion-exchanged with barium and/or strontium, can also be used as the gas adsorption substance 86. The gas adsorption substance 86 that adsorbs a carbon dioxide gas is desired to be a material obtained by ion-exchanging a ZSM-5 type zeolite as a main agent with barium and/or strontium. The carbon dioxide gas adsorption amount of a Na-A type zeolite, which is a part of the conventional technique, is 3 cc/g at a pressure of 10 Pa. On the other hand, the carbon dioxide gas adsorption amount of the barium-ion-exchanged ZSM-5 type zeolite is 12 cc/g at a pressure of 10 Pa, so that a large volume of lean carbon dioxide gas can be adsorbed and removed. Consequently, the vacuum degree of the heat-insulating space in which the gas adsorption device 85 is disposed can be kept high.

The zeolite ion-exchanged with barium and/or strontium as described above is a carbon dioxide adsorption material that includes a ZSM-5 type zeolite containing barium (Ba) and strontium (Sr), with the ZSM-5 type zeolite including a Ba—O—Ba species and/or a Sr—O—Sr species. Accordingly, a strong interaction with carbon dioxide is produced, and therefore even under a condition of lean carbon dioxide with the equilibrium pressure being lower than atmospheric pressure, carbon dioxide is strongly adsorbed, so that a large volume of carbon dioxide can be adsorbed. One example of methods for checking whether the Ba—O—Ba species is contained or not is a method in which FT-IR measurement is performed using adsorbed acetylene as a probe.

The storage container 87 is hardly permeable to gases such as air and water vapor, and plays the role of preventing the gas adsorption substance 86 from coming into contact with a gas before the gas adsorption device 85 is used. The material and shape of the storage container 87 are not particularly limited. For the material of the storage container 87, a metal material such as, for example, aluminum, copper, iron or stainless steel is used. The storage container 87 is molded in a shape of, for example, a narrow and long and flat cylinder.

The example of construction of the refrigerator 20 according to Embodiment 3 is almost the same as the example of construction of the refrigerator 20 shown in the flow chart of FIG. 4. A plurality of gas adsorption devices 85 are dispersively disposed in the heat-insulating space in wall bodies 2 and 3 at the time of attaching components to wall bodies 2 and 3 by the treatment in step S1010 shown in FIG. 4. A urethane liquid of an open-cell urethane foam 4 is injected into the heat-insulating space from the urethane liquid injection port 5 used also as an exhaust hole. When the open-cell urethane foam 4 is formed in the heat-insulating space, then an air hole 6 is sealed with an air hole sealing material. The heat-insulating space is then evacuated from a urethane liquid injection port 5 used also as an exhaust hole to seal the urethane liquid injection port 5 used also as an exhaust hole with a urethane liquid injection port seaming material.

According to this embodiment, the time for bringing the heat-insulating space into vacuum can be shortened. That is, at the time of evacuation, air can be sufficiently exhausted by a vacuum pump at a pressure of viscous flow (low vacuum), but in the high vacuum degree range of molecular flow (high vacuum), the exhaust resistance increases, and therefore it takes much time to exhaust air by a vacuum pump. Thus, gas adsorption devices 85 are dispersively disposed in the heat-insulating space beforehand to cause the gas adsorption devices 85 to exhibit a gas adsorption function. Consequently, the exhaust distance of the open-cell urethane foam 4 is reduced, so that the heat-insulating space can be efficiently decompressed (evacuated).

Further, the gas adsorption device 85 adsorbs a very small amount of gas remaining after the heat-insulating space of the heat-insulating box 21 is evacuated, and therefore the heat-insulating space can be kept at a desired vacuum degree.

A very small amount of gas remaining in the heat-insulating space includes, in addition to air components, a carbon dioxide gas produced by a reaction of water with an isocyanate. Thus, in addition to gas adsorption devices 85 for adsorbing air, gas adsorption devices 85 for adsorbing a carbon dioxide gas may be dispersively disposed in the heat-insulating space.

Gas adsorption devices 86 may be dispersively disposed in the heat-insulating space of the heat-insulating box 21 and the heat-insulating wall according to Embodiment 1 in which evacuation is not performed. When the gas adsorption function of the gas adsorption device is exhibited, degradation of the open-cell urethane foam 4 in the heat-insulating space is further easily prevented.

(Embodiment 4)

A heat-insulating box 21 according to Embodiment 4 of the present invention is formed by molding an open-cell urethane foam 4 by integral foaming with one of wall bodies as a skin material, and mounting the other wall body on the resulting molded body. While this embodiment is described with one of wall bodies being an inner box 3 and the other wall body being an outer box 2, a case where they are interchanged does not lead to a difference, and therefore descriptions of the case are omitted.

FIG. 10 is a sectional view for explaining integral foaming/molding of the heat-insulating box 21. A urethane foaming tool 41a shown in FIG. 10 is similar to the urethane foaming tool 41a shown in FIG. 9 except for a first tool 41a1, and descriptions of similar parts are omitted. The urethane foaming tool 41a described in this embodiment supports a wall body 3 at the time of integral foaming/molding, and functions as a mold for molding the open-cell urethane foam 4. That is, a second tool 41a2 supports the inner box 3 with the inner box 3 fitted in a depression of the tool. On the other hand, the outer box 2 is not fitted in a depression provided in the first tool 41a1, and the depression has a shape conforming to the front surface of the outer box 2, and functions as a mold on the rear surface side of the heat-insulating box 21. Air thrust aside from a heat-insulating space 10 at the time of injecting and foaming an urethane liquid may be discharged from, for example, a gap between the first tool 41a1 and the second tool 41a2. In this case, an air hole 6 of the inner box 3 and a perforation of the second tool 41a2, which is disposed in correspondence with the air hole 6, are not required to be provided.

When the urethane foaming tool 41a is used to perform integral foaming/molding, first the inner box 3 is fitted in the second tool 41a2 as shown in FIG. 10, and the first tool 41a1 is disposed on the second tool 41a2. Consequently, an internal space surrounded by the front surface of the depression of the first tool 41a1 and the rear surface of the inner box 3 is formed. The internal space has a shape identical to that of the heat-insulating space surrounded by the front surface of the outer box 2 and the rear surface of the inner box 3. Accordingly, a tip of a liquid feeding hose 41 of a urethane liquid feeding device 40 is connected to a urethane liquid injection port 5 to inject a urethane liquid to the urethane liquid injection port 5 from the urethane liquid feeding device 40 through the liquid feeding hose 41. Consequently, the urethane liquid is foamed integrally with the inner box 3 to form a molded body with the inner box 3 as a skin material of the open-cell urethane foam 4. The open-cell urethane foam 4 has a shape corresponding to the heat-insulating space. The front surface of the open-cell urethane foam 4 is covered with the inner box 3, while the rear surface thereof is exposed. Thus, the molded body is taken out from the urethane foaming tool 41a, and the rear surface of the open-cell urethane foam 4 is covered with the outer box 2. Consequently, the whole of the open-cell urethane foam 4 is covered with wall bodies 2 and 3 to produce the heat-insulating box 21 with the wall bodies and the open-cell urethane foam 4 molded integrally.

Similar to Embodiment 2, the heat-insulating space surrounded by the inner box 3 and the outer box 2 may be brought into a vacuum state after the open-cell urethane foam 4 foamed integrally with the inner box 3 is covered with the outer box 2. In this case, since an exhaust hole is provided in the inner box 3 and/or the outer box 2, air is exhausted from the exhaust hole to bring the heat-insulating space 10 into a vacuum state, followed by sealing the exhaust hole with an exhaust hole sealing material.

Further, similar to Embodiment 3, a gas adsorption device 85 may be disposed in the heat-insulating space surrounded by the inner box 3 and the outer box 2 after the open-cell urethane foam 4 foamed integrally with the inner box 3 is covered with the outer box 2. Alternatively, the open-cell urethane foam 4 may be foamed integrally with the inner box 3 and the air adsorption device 85 to be molded, followed by mounting the outer box 2 on the resulting molded body.

In the molded body obtained by integral foaming of the inner box 3 and the open-cell urethane foam 4, the rear surface of the open-cell urethane foam 4 is exposed. Thus, a skin layer at an area corresponding to the exhaust hole or the urethane liquid injection port 5 used also as an exhaust hole on the rear surface of the open-cell urethane foam 4 can be removed. Consequently, an area where a large number of cells 47 and through-holes 44 and 45 are present in the open-cell urethane foam 4 is exposed. Therefore, when a vacuum pump is connected to this area, air in the open-cell urethane foam 4 can be smoothly discharged by passing through cells 47 and through-holes 44 and 45.

Further, the inner box 3 may be provided with the air hole 6. In this case, a perforation of the second tool 41a2, which is disposed in correspondence with the air hole 6, is provided. Accordingly, the open-cell urethane foam 4 foamed integrally with the inner box 3 is covered with the outer box 2, followed by sealing the air hole 6 with an air hole sealing material.

Alternatively, the outer box 2 and the open-cell urethane foam 4 may be integrally foamed to be molded, followed by covering the resulting molded body with the inner box 3. In this case, the urethane liquid injection port 5 is provided in the outer box 2, and a perforation 41a3 is provided at a position in the first tool 41a1 which corresponds to the urethane liquid injection port 5. In this case, the open-cell urethane foam 4 foamed integrally with the inner box 2 is covered with the inner box 3, followed by sealing the urethane liquid injection port 5 with a urethane liquid injection port sealing material to form the heat-insulating box 21.

According to the embodiment described above, the inner box 3 and the open-cell urethane foam 4 are integrally foamed to be molded, followed by mounting the other box, i.e. the outer box 2 on the resulting molded body to produce the heat-insulating box 21, so that deformation of the heat-insulating box 21 can be reduced. Specifically, when the outer box 2 is formed of a metal and the inner box 3 is formed of a resin, the thermal expansion coefficient of the outer box 2 is different from the thermal expansion coefficient of each of the inner box 3 and the open-cell urethane foam 4. Therefore, due to heat generated when the urethane liquid undergoes a polymerization reaction, a change in size of the inner box 3 and the open-cell urethane foam 4 is greater than a change in size of the outer box 2. Accordingly, the heat-insulating box 21 formed by combining the outer box 2 and the inner box 3, and then filling the heat-insulating space 10 therebetween with the open-cell urethane foam 4 may be deformed. Thus, the outer box 2 is excluded, and the inner box 3 and the urethane liquid of the open-cell urethane foam 4 are integrally foamed to be molded. Consequently, since the thermal expansion coefficients of the inner box 3 and the open-cell urethane foam 4 are close to each other, they are thermally expanded to the same degree, and then cooled and contracted, so that the resulting molded body is hard to be deformed. When the outer box 2 having a thermal expansion coefficient different from that of the open-cell urethane foam 4 is mounted on the molded body to form the heat-insulating box 21, dimensional deformation of the heat-insulating box 21 can be prevented.

(Other Embodiments)

In all the embodiments described above, the heat-insulating box 21 that is a box-shaped container which has an internal space and is opened at the front has been described as one example of the heat-insulating wall. However, the shape etc. of the heat-insulating wall is not limited thereto. That is, the heat-insulating wall should include a wall body which functions as a skin material, and an open-cell resin body of thermosetting resin which is formed integrally with at least a part of the wall body and which functions as a heat-insulating material. For example, as shown in FIG. 11, a heat-insulating space of a substantially flat plate-shaped wall body 23 may be filled with an open-cell urethane foam 4 to form a substantially flat plate-shaped heat-insulating wall. The heat-insulating wall is used for, for example, a door of a refrigerator 20 and a door of a house. In this case, the wall body 23 includes one hollow container, and its internal space is used as a heat-insulating space.

In all the embodiments described above, the heat-insulating box 21 is used for a flame of the refrigerator 20, but the use of the heat-insulating box 21 is not limited thereto. For example, the heat-insulating box 21 can be used for a pot shown in FIG. 12, a housing of a cooling box, a housing of a thermostatic bath, a housing of a hot water storage tank, a cooler box and the like. In the heat-insulating box 21 in FIG. 12, an outer box 2 and an inner box 3 each have a bottomed cylindrical shape, and the inner box 3 is stored in the outer box 2. The heat-insulating space between the outer box 2 and the inner box 3 is filled with the open-cell urethane foam 4 by integral foaming. A urethane injection port 5 extending through the outer box 2 is sealed with a urethane liquid injection port sealing material 50, and an air hole 6 extending through the inner box 3 is sealed with an air hole sealing material 60.

In all the embodiments described above, the open-cell resin body is the open-cell urethane foam 4, and a thermosetting urethane resin is used as a resin that forms the open-cell resin body. The open-cell resin body and the constituent resin thereof are not limited to the open-cell urethane foam and a thermosetting urethane resin as long as the constituent resin is a thermosetting resin. For example, the open-cell resin body may be an open-cell phenol foam, and a thermosetting phenol resin may be used as a constituent resin thereof. Raw materials of the phenol resin include phenol resin components (e.g. phenol and formaldehyde), a foaming agent and a powder. This powder causes a second through-hole to be formed in a cell skeleton portion of the phenol resin.

In all the embodiments described above, a plurality of polyols having different compositions are used, and by means of distortion resulting therefrom, the first through-hole 44 is formed in the cell film portion 42. Alternatively, for example a foam breaker (e.g. calcium stearate) for breaking the cell film portion 42 may be blended in the urethane liquid.

All the embodiments may be combined as long as they do not exclude one another.

From the foregoing descriptions, many modifications and other embodiments will be apparent to a person skilled in the art. Therefore, the foregoing descriptions should be construed as illustrative only, and have been provided for the purpose of teaching the best mode for carrying out the invention to a person skilled in the art. Details of the structure and/or function of the present invention may be substantially changed without departing from the spirit of the present invention.

EXAMPLES

FIG. 7 is a view showing results of a performance test of an open-cell urethane foam and presence/absence of first and second through-holes 44 and 45. FIG. 8A is a photograph showing a state in which a second through-hole 45 is formed in a cell skeleton portion 43 in Example 1 in FIG. 7. FIG. 8B is a photograph obtained by enlarging the photograph of FIG. 8A. FIG. 8C is a photograph showing a state in which a second through-hole 45 is formed in a cell skeleton portion 43 in Example 2 in FIG. 7. FIG. 8D is a photograph obtained by enlarging the photograph of FIG. 8C. FIG. 8E is a photograph showing a cell skeleton portion 43 and a powder in Comparative Example 1 in FIG. 7. FIG. 8F is a photograph obtained by enlarging the photograph of FIG. 8E.

An open-cell urethane foam was formed by filling a container with a urethane liquid obtained by mixing a first resin component, a second resin component, a foaming agent and a powder, and was used as a test piece. For all the test pieces of Examples 1 and 2 and Comparative Examples 1 and 2, the same first resin component and second resin component were used. For all the test pieces, water was used for the foaming agent. A powder was used for the test pieces of Examples 1 and 2 and Comparative Example 1, but a powder was not used for the test piece of Comparative example 2. Components and SP values of powders used for the test pieces are as shown in FIG. 7, and the particle size of each powder is smaller than a cell, and is 10 to 50 µm.

In each test piece, a cell film portion 42, a cell skeleton portion 43 and a skin layer 4b were each cut. The test piece was observed with a microscope to check whether or not a first or second through-hole 44 or 45 was formed in the portions 42, 43 and 4b.

As a result, it was confirmed that the first through-hole 44 was formed in the cell film portion 42 in all the test pieces of Examples 1 and 2 and Comparative Examples 1 and 2 as shown in FIG. 7. That is, the cell film portion 42 is a filmy partition wall which is as thin as, for example, about 3 µm and is formed as a pair of cells 47 come closely adjacent to each other as shown in FIGS. 2B, 2C, 2F and 2G The first through-hole 44 was formed in the cell film portion 42 as shown as an example in FIGS. 2D and 2E. Thus, it has become apparent that the first through-hole 44 is formed by using a plurality of polyols having different compositions for the first resin component.

On the other hand, whether the second through-hole 45 was generated or not depended on presence/absence of a powder and a SP value of the powder. That is, the cell skeleton portion 43 is a partition wall which is as thick as, for example, 150 µm and is formed as a plurality of cells 47 come closely adjacent to one other as shown in FIGS. 2B, 2C, 2F and 2G. In Example 1 in which the SP value of the powder 46 was 8.1, the second through-hole 45 was formed in the cell skeleton portion 43 as shown in FIGS. 8A and 8B. In Example 2 in which the SP value of the powder 46 was 9.5, the second through-hole 45 was formed in the cell skeleton portion 43 as shown in FIGS. 8C and 8D. On the other hand, in Comparative Example 1 in which the SP value of the powder was 10.1, the powder and the urethane resin were in close contact with each other, and the second through-hole 45 was not formed therebetween in the cell skeleton portion 43 as shown in FIGS. 8E and 8F. In Comparative Example 2 in which the powder 46 was not blended, the second through-hole 45 causing adjacent cells 47 to communicate with each other was not observed in the cell skeleton portion 43 and the skin layer 4b. Thus, it has become apparent that by using the powder 46 having a SP value of 9.5 or less and having low compatibility with a urethane resin, the second through-hole 45 is formed in the skin layer 4b and the cell skeleton portion 43.

Further, the skin layer 4b is a layer which has a high ratio of cell skeleton portions 43 and is abundant in the vicinity of wall bodies 2 and 3. Accordingly, it was difficult to form the second through-hole 43 extending through the cell skeleton portion 43 in the skin layer 4b because the density of the urethane resin was high in the skin layer 4b and the skin layer 4b was hard. On the other hand, by using the powder 46 having low compatibility with a urethane resin, the second through-hole 45 could be formed in the cell skeleton portion 43 of the skin layer 4b to secure continuous air permeability in the skin layer 4b.

The above-mentioned test piece was evacuated to prepare a vacuum pack, and a change in pressure of the inside of the vacuum pack was observed. First a pressure of the inside of the vacuum pack was measured just after preparation of the vacuum pack, the vacuum pack was then left standing for 24 hours under normal pressure and normal temperature, and a pressure of the inside of the vacuum pack was measured again. The former pressure and the latter pressure were compared to each other, and whether or not the pressure increased after the vacuum pack was left standing as compared to the pressure just after preparation of the vacuum pack was determined. "x" is given in FIG. 7 in the case where the pressure increased, and "○" is given in FIG. 7 in the case where the pressure did not increase.

As a result, the pressure of the vacuum pack did not increase in Examples 1 and 2. On the other hand, the pressure of the vacuum pack increased in Comparative Examples 1 and 2. That is, in Comparative Examples 1 and 2, the first through-hole 44 is formed, but the second through-hole 45 is not formed in the cell skeleton portion 43 and the skin layer 4b, and therefore closed cells exist in the urethane foam. The closed cells are broken with elapse of time, so that the pressure of the inside of the vacuum pack increases. On the other hand, in Examples 1 and 2, the second through-hole 45 is formed in addition to the first through-hole 44, so that cells 47 communicate with one another throughout the open-cell urethane foam, and there are no or few closed cells. Consequently, the pressure of the vacuum pack does not change with elapse of time. Accordingly, it has become apparent that in Examples 1 and 2, the first through-hole 44 and the second through-hole 45 are formed to thereby maintain the vacuum degree of the open-cell urethane foam.

INDUSTRIAL APPLICABILITY

The heat-insulating wall, the heat-insulating box and the method for producing the same according to the present invention are useful as a heat-insulating wall which can resist deterioration of heat-insulating properties and deformation as compared to conventional one, and a heat-insulating box and a method for producing the same, etc.

REFERENCE SIGNS LIST 2 outer box (wall body)
3 inner box (wall body)
4 open-cell urethane foam (open-cell resin body)
4a core layer
4b skin layer
42 cell film portion
43 cell skeleton portion
44 first through-hole
45 second through-hole
46 powder
47 cell
21 heat-insulating box (heat-insulating wall, heat-insulating housing)
85 gas adsorption device (adsorbent)

The invention claimed is:

1. A heat-insulating wall comprising:
a wall body whose hollow portion is a heat-insulating space;
an open-cell resin body formed of a thermosetting resin, with which the heat-insulating space is filled by integral foaming; and
powder dispersed in the open-cell resin body,
the open-cell resin body comprising:
a plurality of cells;
a first through-hole formed so as to extend through the thermosetting resin located between neighboring cells; and
a second through-hole formed at an interface between the thermosetting resin and the powder,
wherein the plurality of cells communicate with one another through the first through-hole and the second through-hole,
the dispersed powder is incompatible with the thermosetting resin, and
the open-cell resin body comprises one of an open-cell urethane foam and an open-cell phenol foam.

2. The heat-insulating wall according to claim 1, wherein the size of the powder is smaller than the size of the cell.

3. The heat-insulating wall according to claim 1, wherein the pressure in the wall body is lower than atmospheric pressure.

4. The heat-insulating wall according to claim 1, further comprising a gas adsorption device disposed in the wall body.

5. The heat-insulating wall according to claim 4, wherein the gas adsorption device comprises an adsorbent that adsorbs a carbon dioxide gas, and
the adsorbent includes ZSM-5 zeolite ion-exchanged with at least one of barium and strontium.

6. A heat-insulating housing comprising one or more of the heat-insulating walls according to claim 1.

* * * * *